United States Patent
Harris et al.

(10) Patent No.: US 11,503,071 B2
(45) Date of Patent: Nov. 15, 2022

(54) IDENTIFYING FRAUDULENT REQUESTS FOR CONTENT

(71) Applicant: Oath Inc., New York, NY (US)

(72) Inventors: Robert Jason Harris, Urbana, IL (US);
Jaime Morales, Jr., Urbana, IL (US);
Ruichen Wang, Champaign, IL (US);
Helen W. Xie, Cambridge, MA (US);
Jian Tian, Champaign, IL (US)

(73) Assignee: YAHOO AD TECH LLC, Dulles, VA (US)

( * ) Notice: Subject to any disclaimer, the term of this patent is extended or adjusted under 35 U.S.C. 154(b) by 655 days.

(21) Appl. No.: 16/426,159

(22) Filed: May 30, 2019

(65) Prior Publication Data

US 2020/0382551 A1    Dec. 3, 2020

(51) Int. Cl.
*H04L 9/40*    (2022.01)
*G06F 21/57*    (2013.01)

(52) U.S. Cl.
CPC ........ *H04L 63/1483* (2013.01); *G06F 21/577* (2013.01)

(58) Field of Classification Search
None
See application file for complete search history.

(56) References Cited

U.S. PATENT DOCUMENTS

| | | | |
|---|---|---|---|
| 10,091,312 B1 * | 10/2018 | Khanwalkar | H04L 67/22 |
| 2006/0282660 A1 * | 12/2006 | Varghese | G07F 7/1083 |
| | | | 713/155 |
| 2017/0032412 A1 * | 2/2017 | Scharber | G06F 16/24573 |
| 2017/0220306 A1 * | 8/2017 | Price | G06F 16/9577 |
| 2018/0108015 A1 * | 4/2018 | Rogas | G06F 16/955 |
| 2018/0113899 A1 * | 4/2018 | Htun | H04L 63/1408 |
| 2019/0220591 A1 * | 7/2019 | Burriesci | G06F 21/645 |

FOREIGN PATENT DOCUMENTS

WO    WO-2012088023 A2 *    6/2012    ............. G06Q 10/10

* cited by examiner

*Primary Examiner* — Arezoo Sherkat
(74) *Attorney, Agent, or Firm* — Cooper Legal Group LLC

(57) ABSTRACT

One or more computing devices, systems, and/or methods are provided. A request for content associated with a device and/or a set of request information associated with the request for content may be received. A content item may be transmitted to the device. A set of client information associated with the device may be received. The set of client information may be analyzed to determine a fraudulence label associated with the request for content. Fraud detection information generated based upon the set of request information, the set of client information and/or the fraudulence label may be stored in a fraud detection database. A second request for content associated with a second device and/or a second set of request information associated with the second request for content may be received. A second fraudulence label may be determined based upon the second set of request information and/or the fraud detection database.

20 Claims, 15 Drawing Sheets

IDENTIFYING FRAUDULENT REQUESTS FOR CONTENT

BACKGROUND

Many applications, such as websites, applications, etc. may provide platforms for viewing media. For example, a request for media may be received from a device associated with a user. Responsive to receiving the request for media, media may be transmitted to the device. However, the request for media may be fraudulent.

SUMMARY

In accordance with the present disclosure, one or more computing devices and/or methods are provided. In an example, a first request for content, associated with a first client device, and/or a first set of request information associated with the first request for content may be received. A first content item may be transmitted to the first client device responsive to receiving the first request for content. Responsive to transmitting the first content item to the first client device, a first set of client information associated with the first client device may be received from the first client device. The first set of client information may be analyzed to determine a first fraudulence label associated with the first request for content. A first set of fraud detection information associated with the first request for content may be generated based upon the first set of request information, the first set of client information and/or the first fraudulence label. The first set of fraud detection information may be stored in a fraud detection database comprising a plurality of sets of fraud detection information associated with a plurality of requests for content associated with a plurality of client devices. A second request for content, associated with a second client device, and/or a second set of request information associated with the second request for content may be received. A second fraudulence label associated with the second request for content may be determined based upon the second set of request information and/or the fraud detection database.

In an example, a first request for content, associated with a first client device, and/or a first set of request information associated with the first request for content may be received. A first content item may be transmitted to the first client device responsive to receiving the first request for content. A first set of client information associated with the first client device may be received from the first client device. The first set of client information may be analyzed to determine a first fraudulence label associated with the first request for content.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
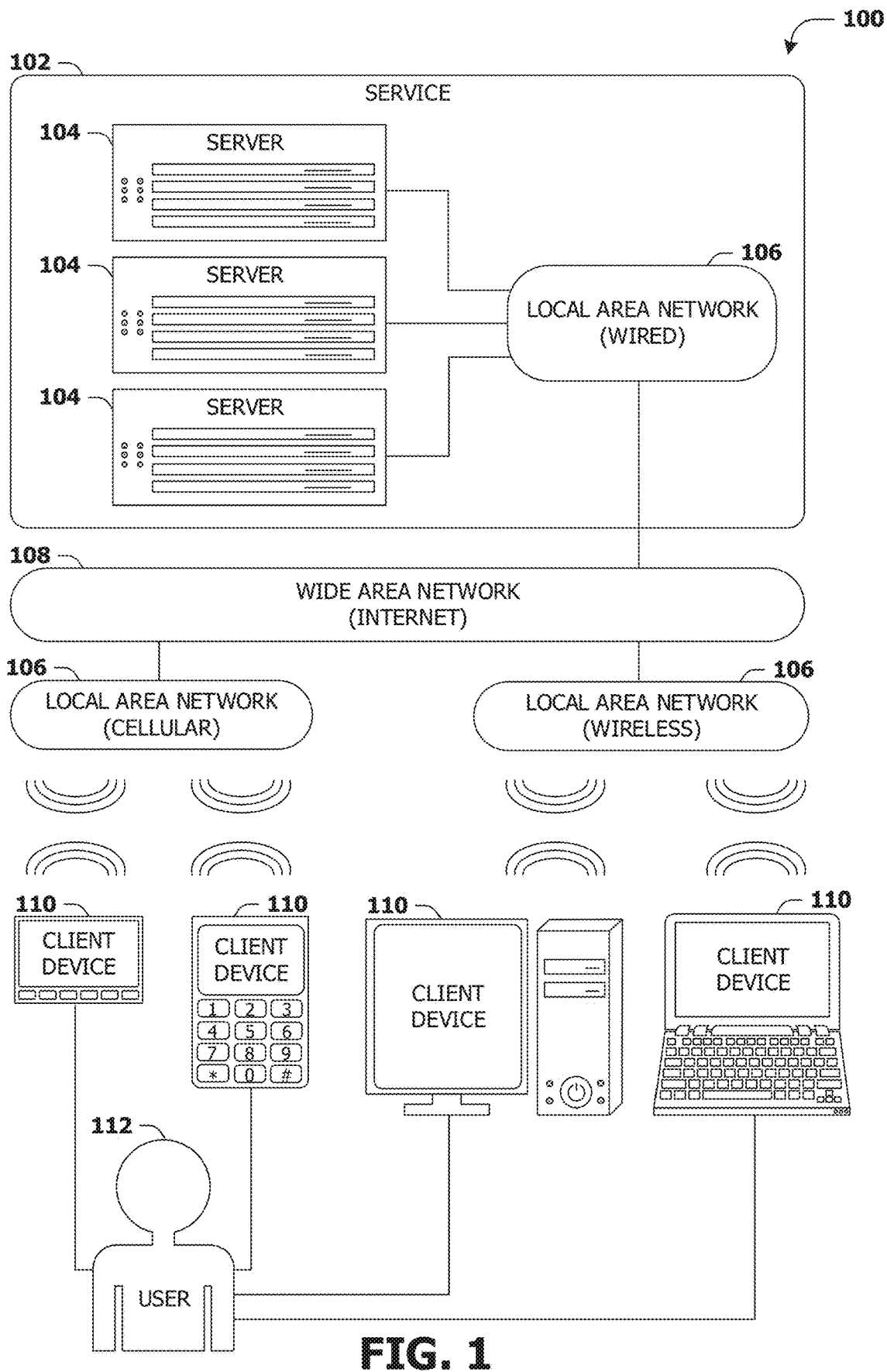
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
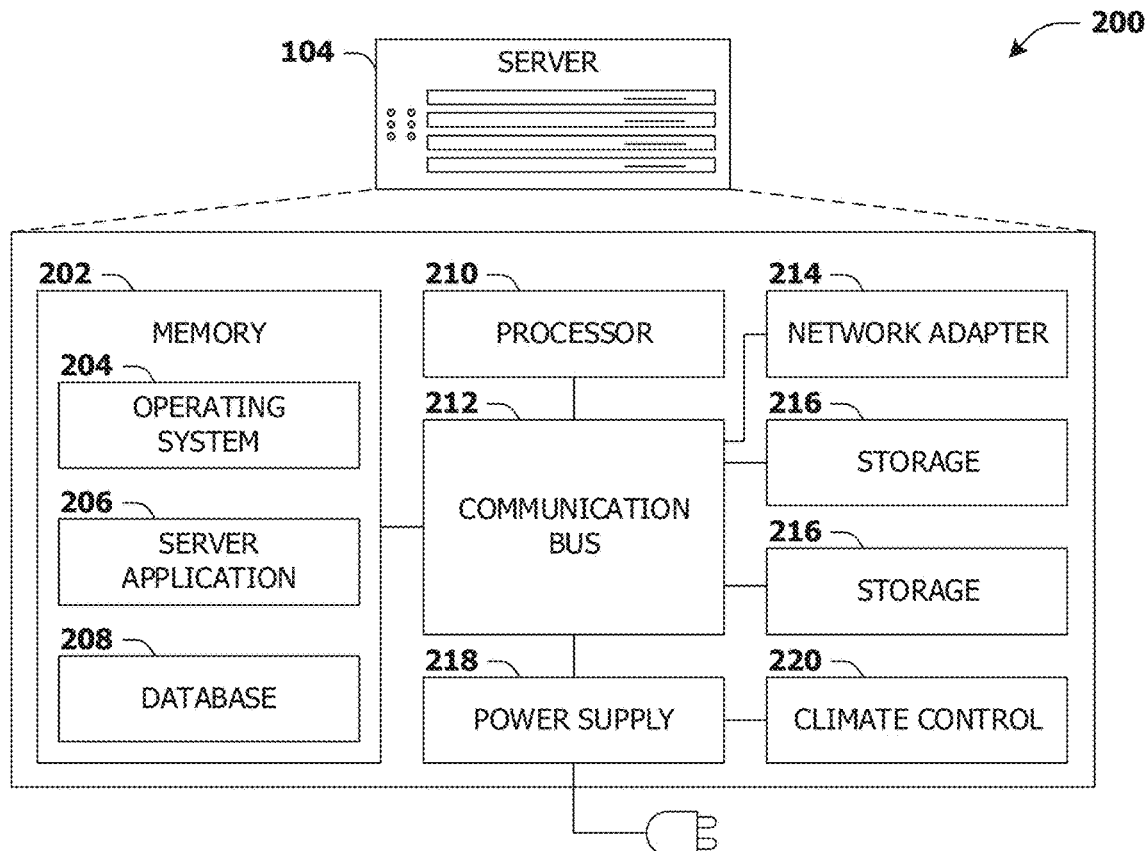
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
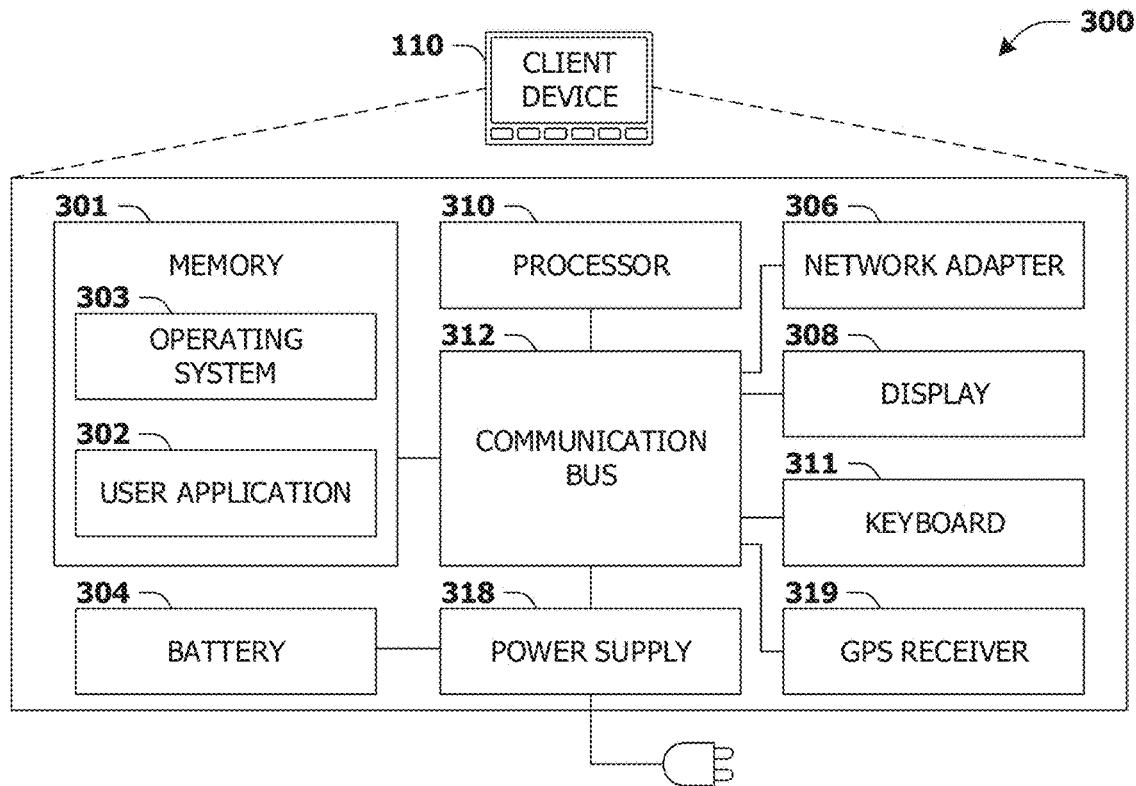
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining whether requests for content are fraudulent are provided. For example, a user (and/or a device associated with the user) may access and/or interact with a service, such as a browser, software, a website, an application, an operating system, etc. that provides a platform for viewing and/or downloading content from a server associated with a content system. In some examples, a request for content may be received from the device. However, the request for content may be fraudulent. For example, the device may be controlled, via one or more of automated operation functionalities, malware, hacking techniques, etc. associated with a malicious entity, to transmit the request for content (to the content system) (without the user's knowing and/or consent). In some examples, the request for content and/or request information associated with the request for content may be analyzed to determine whether the request for content is fraudulent. For example, the request for content may be determined to be fraudulent based upon a determination that an IP address and/or a user identification associated with the device is blacklisted. However, all traffic from the device that is blacklisted may not be fraudulent. Access to other information, separate from the request for content and/or the request information, may facilitate a more accurate determination of whether a request for content is fraudulent and/or a probability that a request for content is fraudulent.

Thus, in accordance with one or more of the techniques presented herein, a first request for content, associated with a first client device, and/or a first set of request information associated with the first request for content may be received. A first content item may be transmitted to the first client device responsive to receiving the first request for content. A first set of client information associated with the first client device may be received from the first client device. For example, one or more executable instructions may be transmitted to the first client device that may be executed by the first client device responsive to the first client device receiving the one or more executable instructions. Execution of the one or more executable instructions by the first client device may cause transmission of the first set of client information by the first client device.

The first set of client information and/or the first set of request information may be analyzed to determine a first fraudulence label associated with the first request for content. The first fraudulence label may be indicative of the first request for content being fraudulent, the first request for content being valid and/or a probability that the first request for content is fraudulent. A first set of fraud detection information associated with the first request for content may be generated based upon the first set of request information, the first set of client information and/or the first fraudulence label. The first set of fraud detection information may be stored in a fraud detection database comprising a plurality of sets of fraud detection information associated with a plurality of requests for content.

A second request for content, associated with a second client device, and/or a second set of request information associated with the second request for content may be received. A second fraudulence label associated with the second request for content may be determined based upon the second set of request information and/or the fraud detection database. For example, the fraud detection database may be analyzed to determine one or more request information characteristics associated with fraudulent requests. The second set of request information may be compared with the one or more request information characteristics associated with fraudulent requests to determine the second fraudulence label (e.g., the second fraudulence label may be indicative of the second request for content being fraudulent, the second request for content being valid and/or a probability that the second request for content is fraudulent).

Figure 4:
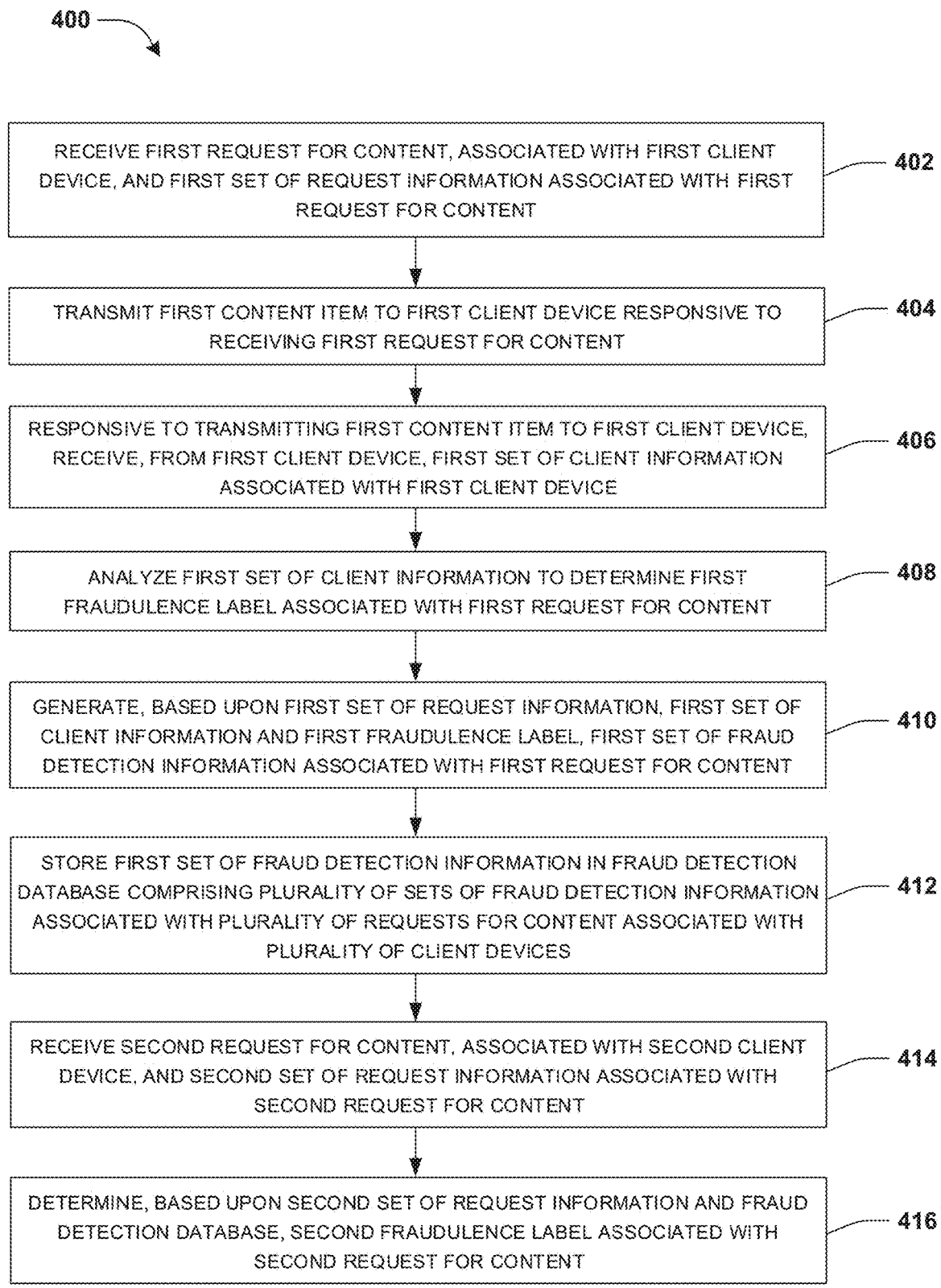
FIG. 4 is a flow chart illustrating an example method for determining whether requests for content are fraudulent.

An embodiment of determining whether requests for content are fraudulent is illustrated by an example method 400 of FIG. 4. A first user, such as user Jill, (and/or a first client device associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system.

In some examples, the content system may be an advertisement system. Alternatively and/or additionally, the content system may not be an advertisement system. Alternatively and/or additionally, the content system may provide content items to be presented via pages associated with the content system. For example, the pages may be associated with websites (e.g., search engine websites, email service websites, news content websites, communication service websites, video platform websites, multimedia platform websites, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application (e.g., a mobile application) associated with the content system and/or within a game associated with the content system. Alternatively and/or additionally, a user may be required to watch and/or interact with the content item before the user can access content of a web page, utilize resources of an application and/or play a game.

At 402, a first request for content, associated with the first client device, and/or a first set of request information associated with the first request for content may be received. In some examples, the first request for content and/or the first set of request information may be received responsive to the first client device accessing an internet resource associated with the content system (e.g., one or more of a web page of a website associated with the content system, an application associated with the content system, an internet game associated with the website system, etc.). For example, the first client device may transmit a request to access the internet resource to a first server associated with the internet resource. Responsive to receiving the request to access the internet resource, the first server associated with the internet resource may transmit the first request for content and/or the first set of request information to the content system (and/or to a second server associated with the content system). Alternatively and/or additionally, the first request for content and/or the first set of request information may be received from the first client device. In some examples, the first request for content may correspond to a request to be provided with a content item (e.g., an advertisement, an image, a link, a video, etc.) for presentation via the internet resource.

In some examples, the first set of request information may be comprised within the first request for content. Alternatively and/or additionally, the first set of request information may be received (by the content system) separately from receiving the first request for content. The first set of request information may comprise a first set of device identification information associated with the first client device. For example, the first set of device identification information may be indicative of an IP address associated with the first client device. Alternatively and/or additionally, the first set of device identification information may comprise a first device capability identifier indicative of device capability information associated with the first client device. Alternatively and/or additionally, the first set of device identification information may comprise a first carrier identifier indicative of carrier information associated with the first client device. Alternatively and/or additionally, the first set of device identification information may comprise a user identifier associated with the first client device. Alternatively and/or additionally, the first set of device identification information may comprise a first device type identifier indicative of a type of device of the first client device (e.g., a desktop computer, a mobile computer, a computer model, etc.).

Alternatively and/or additionally, the first set of request information may comprise a first software identifier indicative of a type of software used to access the internet resource (e.g., a browser, an application, a version of the browser and/or the application, etc.). Alternatively and/or additionally, the first set of request information may comprise a first location identifier indicative of a location associated with the first client device and/or a network that the first client device is connected to (e.g., a country, a state, a province, a city, an area, location coordinates, etc.). Alternatively and/or additionally, the first set of request information may comprise a first local time identifier indicative of a local time of day associated with the first client device and/or the first request for content. For example, the local time of day may correspond to a time of day, at the location of the first client device, associated with transmission and/or reception of the first request for content and/or the request to access the internet resource. Alternatively and/or additionally, the first set of request information may be indicative of the internet resource (e.g., the first set of request information may be indicative of the web address of the web page and/or an application identifier of the application).

In some examples, responsive to receiving the first request for content, a bidding process may be performed to select a first content item, from a plurality of participating content items participating in an auction, for presentation via the first client device. In some examples, the first set of request information may be received in association with the first request for content. Alternatively and/or additionally, the first set of request information may be received prior to the bidding process is performed.

In some examples, the first content item may be selected for presentation via the first client device responsive to a determination that a bid value associated with the first content item is a highest bid value of a plurality of bid values associated with the plurality of participating content items. Alternatively and/or additionally, the first content item may be selected for presentation via the first client device responsive to a determination that a predicted probability of the first user associated with the first client device positively engaging with the first content item is a highest predicted probability of a plurality of predicted probabilities associated with the plurality of participating content items. Alternatively and/or additionally, the first content item may be selected for presentation via the first client device based upon the bid value associated with the first content item and/or the predicted probability of the first user positively engaging with the first content item.

At 404, the first content item may be transmitted to the first client device. For example, the first content item may be transmitted to the first client device responsive to receiving the first request for content and/or responsive to selecting the first content item for presentation via the first client device. In some examples, the first content item may be one or more of an advertisement, an image, a link, a video, etc. The first content item may be presented via the first client device. For example, the first content item may be displayed on one or more locations of the internet resource (e.g., if the resource is the web page, the first content item may be displayed and/or presented on one or more locations of the web page and/or if the resource is the application, the first content item may be displayed and/or presented on one or more locations of the application).

At 406, a first set of client information associated with the first client device may be received from the first client device. In some examples, the first set of client information may be received responsive to transmitting the first content item to the first client device. Alternatively and/or additionally, the first set of client information may be received responsive to the first client device receiving the first content item. Alternatively and/or additionally, the first set of client information may be received responsive to the first content item being presented via the first client device. Alternatively and/or additionally, the first set of client information may be received responsive to a selection of the first content item via the first client device.

In some examples, one or more executable instructions may be transmitted to the first client device in association with the first content item being transmitted to the first client device. For example, the first content item and/or the one or more executable instructions may be transmitted to the first client device via a single set of data. Alternatively and/or additionally, the first content item and/or the one or more executable instructions may be transmitted to the first client device separately.

In some examples, the one or more executable instructions may be comprised within code (e.g., Javascript code and/or code associated with a different programming language) that may be executed by the first client device (e.g., the code may be executed by the browser and/or the application). For example, the one or more executable instructions may be executed by the first client device responsive to receiving the first content item and/or responsive to presenting the first content item. Alternatively and/or additionally, the one or more executable instructions may be executed by the first client device responsive to a selection and/or an impression (e.g., a click, a swipe, etc.) of the first content item via the first client device. In some examples, the one or more executable instructions may comprise instructions to transmit the first set of client information to the content system. For example, execution of the one or more executable instructions may cause the first client device to transmit the first set of client information to the content system.

In some examples, the first set of client information may comprise a second set of device identification information associated with the first client device. For example, the second set of device identification information may be indicative of an IP address associated with the first client device. Alternatively and/or additionally, the second set of device identification information may comprise a second device capability identifier indicative of device capability information associated with the first client device. Alternatively and/or additionally, the second set of device identification information may comprise a second carrier identifier indicative of carrier information associated with the first client device. Alternatively and/or additionally, the second set of device identification information may comprise a user identifier associated with the first client device. Alternatively and/or additionally, the second set of device identification information may comprise a second device type identifier indicative of a type of device of the first client device (e.g., a desktop computer, a mobile computer, a computer model, etc.).

Alternatively and/or additionally, the first set of client information may comprise a second software identifier indicative of a type of software used to access the internet resource (e.g., a browser, an application, a version of the browser and/or the application, etc.). Alternatively and/or additionally, the first set of client information may comprise a second location identifier indicative of a location associated with the first client device and/or a network that the first client device is connected to.

Alternatively and/or additionally, the first set of client information may be indicative of a content item presentation size associated with presentation of the first content item using the first client device. For example, the content item presentation size may correspond to a quantity of pixels used to display the first content item. Alternatively and/or additionally, the content item presentation size may correspond to dimensions (e.g., length and/or width) of an area within which the first content item is displayed. Alternatively and/or additionally, the content item presentation size may correspond to a proportion of the internet resource and/or a screen of the first client device that is used to display the first content item.

Alternatively and/or additionally, the first set of client information may be indicative of one or more software capabilities associated with the first client device. For example, the one or more software capabilities may correspond to one or more plugins installed on a browser of the first client device. Alternatively and/or additionally, the one or more software capabilities may correspond to one or more functionalities of the browser of the first client device (e.g., one or more application programming interface (API) features, such as one or more JavaScript API features).

Alternatively and/or additionally, the first set of client information may be indicative of one or more automated operation functionalities associated with the browser of the first client device. For example, the one or more automated operation functionalities may be provided by a plugin and/or software that may automatically perform operations using the browser, such as one or more of navigate through and/or access web pages and/or internet content, perform selections of selectable inputs (e.g., selections of links, content items, etc.), download content from the Internet, etc. In some examples, the one or more automated functionalities may be identified by analyzing the first set of client information to identify an automated functionality plugin and/or automated functionality software indicated by the one or more software capabilities. For example, an automated software list comprising a plurality of known automated functionality plugins and/or known automated functionality software associated with automated functionalities may be analyzed based upon the automated functionality plugin and/or the automated functionality software to determine that the automated functionality plugin and/or the automated functionality software provides the one or more automated functionalities.

At 408, the first set of client information may be analyzed to determine a first fraudulence label associated with the first request for content. The first fraudulence label may be indicative of the first request for content being fraudulent, the first request for content being valid and/or a first probability that the first request for content is fraudulent. In some examples, the first fraudulence label may be determined based upon the first set of request information and/or the first set of client information.

In some examples, the first fraudulence label may be determined based upon the one or more automated operation functionalities. For example, the first request for content may be determined to be fraudulent based upon a determination that the first client device has the one or more automated operation functionalities. For example, it may be determined (and/or predicted) that the first request for content was received as a result of operations performed by the automated functionality plugin and/or the automated functionality software (using the one or more automated operation functionalities). For example, it may be determined that the first request for content was received as a result of one or more of navigating through web pages, navigating through an application, selections of selectable inputs, etc. performed by the automated functionality plugin and/or the automated functionality, rather than via user interactions (by the first user). Thus, it may be determined that a probability that a user (e.g., the first user) viewed the content item is minimal and/or less than a threshold probability. In some examples, the first fraudulence label may be indicative of the first request for content being fraudulent based upon the determination that the first client device has the one or more automated operation functionalities. Alternatively and/or additionally, the first probability that the first request for content is fraudulent may be determined based upon the one or more automated operation functionalities.

Alternatively and/or additionally, the first fraudulence label may be determined based upon the content item presentation size. For example, the content item presentation size may be compared with a threshold content item presentation size. In some examples, the first request for content may be determined to be fraudulent responsive to a determination that the content item presentation size does not meet the threshold content item presentation size. The content item presentation size not meeting the threshold content item presentation size (e.g., the content item presentation size being smaller than the threshold content item presentation size) may be indicative of the first content item not being (clearly) visible and/or the first content item being barely visible to the first user. Alternatively and/or additionally, a selection and/or an impression of the first content item may correspond to an accidental selection and/or an accidental impression of the first content item if the content item presentation size does not meet the threshold content item presentation size (e.g., the selection of the first content item may correspond to a click, by the first user, on a space of the internet resource that the first user did not know would cause a selection of the first content item). In some examples, the first fraudulence label may be indicative of the first request for content being fraudulent based upon the determination that the content item presentation size does not meet the threshold content item presentation size. Alternatively and/or additionally, the first probability that the first request for content is fraudulent may be determined based upon the content item presentation size (e.g., a larger content item presentation size may correspond to a lower probability that the first request for content is fraudulent).

In some examples, the first fraudulence label may be determined based upon a comparison of the first set of client information with the first set of request information. For example, the first set of client information may be compared with the first set of request information to identify one or more inconsistencies between the first set of client information and the first set of request information. The first fraudulence label may be determined based upon the one or more inconsistencies. For example, the first fraudulence label may be indicative of the first request for content being fraudulent based upon the one or more inconsistencies. Alternatively and/or additionally, the first probability that the first request for content is fraudulent may be determined based upon the one or more inconsistencies.

In some examples, an inconsistency of the one or more inconsistencies may correspond to a difference between a first indication of an attribute in the first set of request information and a second indication of the attribute in the second set of request information. For example, the attribute may correspond to one or more of device capability information associated with the first client device, carrier information associated with the first client device, a type of device of the first client device, a type of software used to access the internet resource, a location associated with the first client device, etc. In some examples, the inconsistency may be indicative of the attribute being incorrectly defined via the first set of request information (e.g., the first set of request information may be spoofed such that the attribute is incorrectly defined).

In an example of an inconsistency of the one or more inconsistencies, the first set of request information (and/or the first device capability identifier of the first set of request information) may be compared with the first set of client information (and/or the second device capability identifier of the first set of client information) to determine that first capability information of the first set of request information is different than second capability information of the first set of client information (e.g., it may be determined that the first device capability identifier is inconsistent with the second device capability identifier). For example, the first capability information may be indicative of first functionalities and/or first resources of the first client device and the second device capability may be indicative of second functionalities and/or second resources of the first client device, different than and/or contradictory to the first functionalities and/or the first resources.

For example, the first capability information may be indicative of functionalities and/or resources of a mobile computer (e.g., a smartphone and/or a tablet) and the second capability information may be indicative of functionalities and/or resources of a desktop server. In some examples, the first fraudulence label may be determined based upon the first device capability identifier being inconsistent with the second device capability identifier and/or the first capability information being different than the second capability information (e.g., the first fraudulence label may be indicative of the first request for content being fraudulent and/or the first probability that the first request for content is fraudulent may be determined based upon the first capability information being different than the second capability information).

In another example of an inconsistency of the one or more inconsistencies, the first set of request information (and/or the first device type identifier of the first set of request information) may be compared with the first set of client information (and/or the second device type identifier of the first set of client information) to determine that first device type information of the first set of request information is different than second device type information of the first set of client information (e.g., it may be determined that the first device type identifier is inconsistent with the second device type identifier). For example, the first device type information may be indicative of the first client device being a first type of device and the second device type may be indicative of the first client device being a second type of device, different than and/or contradictory to the first type of device.

For example, the first device type information may be indicative of the first client device being a smartphone and/or the second device type information may be indicative of the first client device being a desktop computer. In some examples, the first fraudulence label may be determined based upon the first device type identifier being inconsistent with the second device type identifier and/or the first device type information being different than the second device type information (e.g., the first fraudulence label may be indicative of the first request for content being fraudulent and/or the first probability that the first request for content is fraudulent may be determined based upon the first device type information being different than the second device type information).

In another example of an inconsistency of the one or more inconsistencies, the first set of request information (and/or the first software identifier of the first set of request information) may be compared with the first set of client information (and/or the second software identifier of the first set of client information) to determine that first software information of the first set of request information is different than second software information of the first set of client information (e.g., it may be determined that the first software identifier is inconsistent with the second software identifier). For example, the first software information may be indicative of a first type of software used to access the internet resource and/or transmit the first request for content and the second software information may be indicative of a second type of software used to access the internet resource and/or display the first content item, different than and/or contradictory to the first type of software.

For example, the first type of software may correspond to a first version of a first browser and/or the second type of software may correspond to a second version of the first browser, different than the first version. Alternatively and/or additionally, the first type of software may correspond to the first browser and/or the second type of software may correspond to a second browser, different than the first browser. Alternatively and/or additionally, the first type of software may correspond to a browser configured for use on a mobile device and/or the second type of software may correspond to a browser configured for use on a desktop. In some examples, the first fraudulence label may be determined based upon the first software identifier being inconsistent with the second software identifier and/or the first type of software being different than the second type of software (e.g., the first fraudulence label may be indicative of the first request for content being fraudulent and/or the first probability that the first request for content is fraudulent may be determined based upon the first type of software being different than the second type of software).

Alternatively and/or additionally, an inconsistency of the one or more inconsistencies may correspond to the first set of request information comprising a first IP address and/or a first client device identifier and the first set of client information comprising a second IP address and/or a second client device identifier, where the second IP address and/or the second client device identifier are different than and/or contradictory to the first IP address and/or the first client device identifier.

Alternatively and/or additionally, an inconsistency of the one or more inconsistencies may correspond to the first carrier identifier of the first set of request information being indicative of a first carrier and the second carrier identifier of the first set of client information being indicative of a second carrier, different than and/or contradictory to the first carrier. Alternatively and/or additionally, an inconsistency of the one or more inconsistencies may correspond to the first location identifier of the first set of request information being indicative of a first location of the first client device and the second location identifier of the first set of client information being indicative of a second location of the first client device, different than and/or contradictory to the first location.

At 410, a first set of fraud detection information associated with the first request for content may be generated based upon the first set of request information, the first set of client information and/or the first fraudulence label. In some examples, the first set of fraud detection information may comprise at least a portion of the first set of request information. Alternatively and/or additionally, the first set of fraud detection information may comprise at least a portion of the first set of client information. Alternatively and/or additionally, the first set of fraud detection information may comprise the first fraudulence label.

Alternatively and/or additionally, in an example where the first fraudulence label is indicative of the first request for content being fraudulent and/or where the fraudulence label is indicative of the first probability that the first request for content is higher than a threshold fraudulence probability, the first set of fraud detection information may comprise an indication of one or more reasons contributing to the first request for content being determined to be fraudulent and/or the first probability being determined to be higher than the threshold probability. For example, the first set of fraudulence label may be indicative of the first client device having the one or more automated operation functionalities, the content item presentation size not meeting the threshold content item presentation size and/or the one or more inconsistencies between the first set of client information and the first set of request information.

Alternatively and/or additionally, in an example where the first fraudulence label is indicative of the first request for content being fraudulent and/or where the fraudulence label is indicative of the first probability that the first request for content is fraudulent being higher than the threshold fraudulence probability, the first client device may be blacklisted. For example, the first client device identifier, the second client device identifier, the first IP address and/or the second IP address may be included in a list of blacklisted client device identifiers. In some examples, responsive to receiving an exemplary request for content associated with the first client device (after receiving the first request for content), the list of blacklisted client device identifiers may be analyzed based upon the exemplary request for content. A content item associated with the exemplary request for content may not be transmitted to the first client device based upon a determination that the first client device is blacklisted. In some examples, the first client device may be blacklisted for merely a temporary duration of time. For example, upon completion of the temporary duration of time, the first client device identifier, the second client device identifier, the first IP address and/or the second IP address may be removed from the list of blacklisted client device identifiers.

At 412, the first set of fraud detection information may be stored in a fraud detection database. The fraud detection database may comprise a plurality of sets of fraud detection information associated with a plurality of requests for content associated with a plurality of client devices.

In some examples, the fraud detection database may comprise a first plurality of sets of fraud detection information, of the plurality of sets of fraud detection information, associated with fraudulent requests for content. In some examples, the first plurality of sets of fraud detection information may be associated with a first set of requests for content, of the plurality of requests for content, associated with one or more fraudulence labels indicative of the first set of requests for content being fraudulent. Alternatively and/or additionally, requests for content of the first set of requests for content may be associated with one or more fraudulence labels indicative of probabilities that the requests for content are fraudulent being higher than the threshold fraudulence probability. In an example where the first fraudulence label is indicative of the first request for content being fraudulent and/or where the fraudulence label is indicative of the first probability that the first request for content is fraudulent being higher than the threshold fraudulence probability, the first set of fraud detection information may be included in the first plurality of sets of fraud detection information associated with fraudulent requests for content.

Alternatively and/or additionally, the fraud detection database may comprise a second plurality of sets of fraud detection information, of the plurality of sets of fraud detection information, associated with valid requests for content (e.g., requests for content that are not fraudulent). In some examples, the second plurality of sets of fraud detection information may be associated with a second set of requests for content, of the plurality of requests for content, associated with one or more fraudulence labels indicative of the requests for content of the second set of requests for content being valid. Alternatively and/or additionally, requests for content of the second set of requests for content may be associated with one or more fraudulence labels indicative of probabilities that the requests for content are fraudulent being lower than the threshold fraudulence probability.

In some examples, first request information associated with fraudulent requests for content may be analyzed to determine one or more request information characteristics associated with fraudulent requests for content. The first request information associated with fraudulent requests for content may be associated with the first set of requests for content. For example, the first plurality of sets of fraud detection information associated with fraudulent requests for content may be analyzed to determine the one or more request information characteristics. Alternatively and/or additionally, a plurality of sets of request information associated with the first plurality of sets of fraud detection information may be analyzed to determine the one or more request information characteristics. For example, the first request information associated with fraudulent requests for content may correspond to the plurality of sets of request information. For example, a set of request information of the plurality of sets of request information may correspond to information, associated with a request for content of the first set of requests for content, received prior to a bidding process associated with the request for content is performed. In an example where the first fraudulence label is indicative of the first request for content being fraudulent and/or where the fraudulence label is indicative of the first probability that the first request for content is fraudulent being higher than the threshold fraudulence probability, at least a portion of the first set of request information may be included in the first request information associated with fraudulent requests for content and/or in the plurality of sets of request information.

In some examples, the one or more request information characteristics associated with fraudulent requests for content may be determined by analyzing the first request information (and/or the plurality of sets of request information) to detect and/or identify patterns, features and/or characteristics of the first request information (and/or the plurality of sets of request information). For example, the one or more request information characteristics associated with fraudulent requests for content may correspond to the patterns, the features and/or the characteristics of the first request information.

Alternatively and/or additionally, the one or more request information characteristics associated with fraudulent requests for content may be determined based upon second request information associated with valid requests for content (e.g., the second request information associated with valid requests for content may be associated with the second plurality of sets of fraud detection information). For example, the first request information associated with fraudulent requests for content may be compared with the second request information associated with valid requests for content to detect and/or identify patterns, features and/or characteristics exhibited by the first request information associated with fraudulent requests for content that are not exhibited by (and/or are less frequently exhibited by) the second request information associated with valid requests for content.

Accordingly, the one or more request information characteristics associated with fraudulent requests for content may be indicative of patterns, features and/or characteristics of sets of request information received in association with fraudulent requests for content. Thus, the one or more request information characteristics associated with fraudulent requests for content may be used to identify fraudulent requests of content by comparing received sets of request information (received in association with requests for content) with the one or more request information characteristics associated with fraudulent requests for content.

In some examples, the one or more request information characteristics associated with fraudulent requests for content may be indicative of web address characteristics associated with fraudulent requests for content. For example, the one or more request information characteristics associated with fraudulent requests for content may comprise one or more domain names associated with fraudulent requests for content. Alternatively and/or additionally, the one or more request information characteristics associated with fraudulent requests for content may comprise one or more top-level domains and/or second-level domains associated with fraudulent requests for content. The one or more web address characteristics may be determined by identifying indications of the one or more web address characteristics within the first request information associated with fraudulent requests for content.

Alternatively and/or additionally, the one or more request information characteristics associated with fraudulent requests for content may be indicative of one or more first applications that are associated with fraudulent requests for content. For example, the one or more request information characteristics associated with fraudulent requests for content may be indicative of one or more first application identifiers associated with the one or more first applications. The one or more first applications and/or the one or more first application identifiers may be determined by identifying indications of the one or more first applications and/or the one or more first application identifiers within the first request information associated with fraudulent requests for content.

Alternatively and/or additionally, the one or more request information characteristics associated with fraudulent requests for content may be indicative of one or more first local times of day associated with fraudulent requests for content. For example, a local time of day of the one or more first local times of day may be determined by analyzing the first request information associated with fraudulent requests for content to determine that a proportion of requests for content of the first set of requests for content are received during the local time of day and/or that the proportion of requests for content that are received during the local time of day meets a threshold proportion.

Alternatively and/or additionally, the one or more request information characteristics associated with fraudulent requests for content may be indicative of one or more software characteristics associated with fraudulent requests for content. For example, the one or more request information characteristics associated with fraudulent request for content may be indicative of one or more first types of software (e.g., one or more browsers and/or one or more browser versions) used for accessing internet resources and/or for transmission of fraudulent requests for content. The one or more first types of software may be determined by identifying indications of the one or more first types of software within the first request information associated with fraudulent requests for content.

Alternatively and/or additionally, the one or more request information characteristics associated with fraudulent requests for content may be indicative of one or more client device identifiers, one or more device capability identifiers, one or more carrier identifiers and/or one or more device type identifiers associated with fraudulent requests for content. The one or more client device identifiers, the one or more device capability identifiers, the one or more carrier identifiers and/or the one or more device type identifiers may be determined by identifying indications of the one or more client device identifiers, the one or more device capability identifiers, the one or more carrier identifiers and/or the one or more device type identifiers within the first request information associated with fraudulent requests for content.

In some examples, first client information associated with fraudulent requests for content may be analyzed to determine one or more client information characteristics associated with fraudulent requests for content. The first client information associated with fraudulent requests of content may be associated with the first set of requests for content. For example, the first plurality of sets of fraud detection information associated with fraudulent requests for content may be analyzed to determine the one or more client information characteristics. Alternatively and/or additionally, a plurality of sets of client information associated with the first plurality of sets of fraud detection information may be analyzed to determine the one or more client information characteristics. For example, the first client information associated with fraudulent requests for content may correspond to the plurality of sets of client information. For example, a set of client information of the plurality of sets of client information may correspond to information, associated with a request for content of the first set of requests for content, received after transmitting a content item associated with the request for content to a client device associated with the request for content (e.g., the set of client information may be received via execution of one or more executable instructions responsive to the content item being presented via the client device and/or responsive to a selection of the content item). In an example where the first fraudulence label is indicative of the first request for content being fraudulent and/or where the fraudulence label is indicative of the first probability that the first request for content is fraudulent being higher than the threshold fraudulence probability, at least a portion of the first set of client information may be included in the first client information associated with fraudulent requests for content and/or in the plurality of sets of client information.

In some examples, the one or more client information characteristics associated with fraudulent requests for content may be determined by analyzing the first client information (and/or the plurality of sets of client information) to detect and/or identify patterns, features and/or characteristics of the first client information (and/or the plurality of sets of client information). For example, the one or more client information characteristics associated with fraudulent requests for content may correspond to the patterns, the features and/or the characteristics of the first client information.

Alternatively and/or additionally, the one or more client information characteristics associated with fraudulent requests for content may be determined based upon second client information associated with valid requests for content (e.g., the second client information associated with valid requests for content may be associated with the second plurality of sets of fraud detection information). For example, the first client information associated with fraudulent requests for content may be compared with the second client information associated with valid requests for content to detect and/or identify patterns, features and/or characteristics exhibited by the first client information associated with fraudulent requests for content that are not exhibited by (and/or are less frequently exhibited by) the second client information associated with valid requests for content.

Accordingly, the one or more client information characteristics associated with fraudulent requests for content may be indicative of patterns, features and/or characteristics of sets of client information received in association with fraudulent requests for content. Thus, the one or more client information characteristics associated with fraudulent requests for content may be used to identify fraudulent requests of content by comparing received sets of client information with the one or more client information characteristics associated with fraudulent requests for content.

In some examples, the one or more client information characteristics associated with fraudulent requests for content may be indicative of one or more first software capability characteristics associated with fraudulent requests for content. For example, the one or more client information characteristics associated with fraudulent requests for content may be indicative of one or more first plugins and/or one or more first software capabilities associated with fraudulent requests for content. For example, the one or more plugins and/or the one or more software capabilities may be determined by identifying the one or more plugins and/or the one or more software capabilities within the first client information associated with fraudulent requests for content.

In some examples, the one or more request information characteristics and/or the one or more client information characteristics associated with fraudulent requests for content may be determined using a machine learning model. For example, the plurality of sets of fraud detection information associated with the plurality of requests for content may be input to the machine learning model. The plurality of sets of fraud detection information may be used by the machine learning model as training data to automatically determine the one or more request information characteristics and/or the one or more client information characteristics associated with fraudulent requests for content based upon the plurality of sets of fraud detection information.

At 414, a second request for content, associated with a second client device, and/or a second set of request information associated with the second request for content may be received. In some examples, the second request for content and/or the second set of request information may be received responsive to the second client device accessing a second internet resource associated with the content system (e.g., one or more of a web page of a website associated with the content system, an application associated with the content system, an internet game associated with the website system, etc.). In some examples, the second request for content may correspond to a request to be provided with a content item (e.g., an advertisement, an image, a link, a video, etc.) for presentation via the second internet resource.

In some examples, the second set of request information may be comprised within the second request for content. Alternatively and/or additionally, the second set of request information may be received (by the content system) separately from receiving the second request for content. The first set of request information may comprise a third set of device identification information associated with the second client device. For example, the third set of device identification information may be indicative of an IP address associated with the second client device. Alternatively and/or additionally, the third set of device identification information may comprise a third device capability identifier indicative of device capability information associated with the second client device. Alternatively and/or additionally, the third set of device identification information may comprise a third carrier identifier indicative of carrier information associated with the second client device. Alternatively and/or additionally, the third set of device identification information may comprise a user identifier associated with the second client device. Alternatively and/or additionally, the third set of device identification information may comprise a third device type identifier indicative of a type of device of the second client device.

Alternatively and/or additionally, the second set of request information may comprise a third software identifier indicative of a third type of software used to access the second internet resource. Alternatively and/or additionally, the second set of request information may comprise a third location identifier indicative of a location associated with the second client device and/or a network that the second client device is connected to. Alternatively and/or additionally, the second set of request information may comprise a second local time identifier indicative of a local time of day associated with the second client device and/or the second request for content. For example, the local time of day may correspond to a time of day, at the location of the second client device, associated with transmission and/or reception of the second request for content. Alternatively and/or additionally, the second set of request information may be indicative of the second internet resource (e.g., the second set of request information may be indicative of the web address of the second internet resource and/or an application identifier of the second internet resource).

At 416, a second fraudulence label associated with the second request for content may be determined based upon the second set of request information and/or the fraud detection database. The second fraudulence label may be indicative of the second request for content being fraudulent, the second request for content being valid and/or a second probability that the second request for content is fraudulent.

In some examples, the second fraudulence label may be determined based upon the second set of request information and/or the one or more request information characteristics associated with fraudulent requests for content. For example, the second set of request information may be compared with the one or more request information characteristics associated with fraudulent requests for content to determine a similarity between the second set of request information and the one or more request information characteristics associated with fraudulent requests for content. The second fraudulence label may be determined based upon the similarity. For example, a higher similarity between the second set of request information and the one or more request information characteristics associated with fraudulent requests for content may correspond to a higher probability that the second request for content is fraudulent. Alternatively and/or additionally, the second fraudulence label may be indicative of the second request for content being fraudulent if the similarity meets a similarity threshold.

In some examples, the second fraudulence label and/or the similarity may be determined based upon a determination that one or more characteristics of the second set of request information matches one or more characteristics of the one or more request information characteristics associated with fraudulent requests for content. In some examples, the similarity may correspond to a quantity of characteristics and/or attributes of the second set of request information that match the one or more request information characteristics associated with fraudulent requests for content. Alternatively and/or additionally, the threshold similarity may correspond to a threshold quantity of characteristics and/or attributes of the second set of request information that match the one or more request information characteristics associated with fraudulent requests for content.

The second fraudulence label may be indicative of the second request for content being fraudulent based upon a determination that one or more characteristics of the second set of request information matches one or more characteristics of the one or more request information characteristics. Alternatively and/or additionally, the second probability that the second request is fraudulent may be determined based upon a determination that one or more characteristics of the second set of request information matches one or more characteristics of the one or more request information characteristics.

In an example, the second fraudulence label and/or the similarity may be determined based upon the second local time identifier of the second set of request information being indicative of a first local time of day associated with the second request for content matching a local time of day of the one or more first local times of day associated with the one or more request information characteristics associated with fraudulent requests for content. For example, the first local time of day may correspond to 3:14 AM and/or the local time of day of the one or more first local times of day may correspond to 3:00 AM-4:00 AM. The second fraudulence label may be indicative of the second request for content being fraudulent based upon the determination that the first local time of day associated with the second request for content matches a local time of day of the one or more first local times of day. Alternatively and/or additionally, the second probability that the second request is fraudulent may be determined based upon the determination that the first local time of day associated with the second request for content matches a local time of day of the one or more first local times of day.

In another example, the second fraudulence label and/or the similarity may be determined based upon the second internet resource associated with the second request for content matching a web address characteristic of the web address characteristics associated with fraudulent requests for content. For example, a first domain name (e.g., www.frequencybuys.xyz) of the second internet resource may match (e.g., be similar to and/or be related to) a domain name of the one or more request information characteristics associated with fraudulent requests for content. Alternatively and/or additionally, a first top-level domain (e.g., xyz) of the second internet resource may match a top-level domain of the one or more request information characteristics associated with fraudulent requests for content. Alternatively and/or additionally, a first second-level domain (e.g., frequencybuys) of the second internet resource may match a second-level domain of the one or more request information characteristics associated with fraudulent requests for content. The second fraudulence label may be indicative of the second request for content being fraudulent based upon the determination that the second internet resource associated with the second request for content matches a web address characteristic of the web address characteristics associated with fraudulent requests for content. Alternatively and/or additionally, the second probability that the second request is fraudulent may be determined based upon the determination that the second internet resource matches a web address characteristic of the web address characteristics associated with fraudulent requests for content.

In another example, the second fraudulence label and/or the similarity may be determined based upon the second internet resource associated with the second request for content matching an application of the one or more first applications associated with fraudulent requests for content. For example, a first application identifier (e.g., "Frequency Buys App") of the second internet resource may match (e.g., be similar to and/or be related to) an application identifier of the one or more first application identifiers associated with fraudulent requests for content. The second fraudulence label may be indicative of the second request for content being fraudulent based upon the determination that the second internet resource associated with the second request for content matches an application of the one or more first applications associated with fraudulent requests for content. Alternatively and/or additionally, the second probability that the second request is fraudulent may be determined based upon the determination that the second internet resource matches an application of the one or more first applications associated with fraudulent requests for content.

In another example, the second fraudulence label and/or the similarity may be determined based upon the third type of software (used to access the second internet resource) matching a type of software of the one or more first types of software associated with fraudulent requests for content. For example, the third software identifier (e.g., "Big Browser v10.4.2") associated with the third type of software may match (e.g., be similar to and/or be related to) a software identifier associated with the type of software of the one or more first types of software associated with fraudulent requests for content. The second fraudulence label may be indicative of the second request for content being fraudulent based upon the determination that the third type of software associated with the second request for content matches a type of software of the one or more first types of software associated with fraudulent requests for content. Alternatively and/or additionally, the second probability that the second request is fraudulent may be determined based upon the determination that the third type of software associated with the second request for content matches a type of software of the one or more first types of software associated with fraudulent requests for content.

In another example, the second fraudulence label and/or the similarity may be determined based upon a third client device identifier (e.g., the IP address associated with the second client device) matching a client device identifier of the one or more client device identifiers associated with fraudulent requests for content. Alternatively and/or additionally, the second fraudulence label and/or the similarity may be determined based upon the third device capability identifier matching a device capability identifier of the one or more device capability identifiers associated with fraudulent requests for content. Alternatively and/or additionally, the second fraudulence label and/or the similarity may be determined based upon the third carrier identifier matching a carrier identifier of the one or more carrier identifiers associated with fraudulent requests for content. Alternatively and/or additionally, the second fraudulence label and/or the similarity may be determined based upon the third device type identifier matching a device type identifier of the one or more device type identifiers associated with fraudulent requests for content.

In some examples, a bidding process may be performed to select a second content item, from a plurality of participating content items participating in an auction, for presentation via the second client device. The bidding process may be performed responsive to a determination that the second request for content is valid (e.g., not fraudulent) and/or responsive to a determination that the second probability that the second request for content is fraudulent is less than the threshold fraudulence probability.

Alternatively and/or additionally, the bidding process may be performed responsive to a determination that the second probability that the second request for content is fraudulent is higher than the threshold fraudulence probability. For example, the bidding process may be performed based upon the second probability that the second request for content is fraudulent (e.g., the second probability may be input to a bidding system performing the bidding process). In some examples, the second content item may be selected for presentation via the second client device responsive to a determination that a bid value associated with the second content item is a highest bid value of a plurality of bid values associated with the plurality of participating content items. The plurality of bid values may be generated based upon the second probability that the second request for content is fraudulent. For example, a higher probability that the second request for content is fraudulent may result in lower bid values of the plurality of bid values.

In some examples, the second content item may be selected for presentation via the second client device responsive to a determination that a predicted probability of a second user associated with the second client device positively engaging with the second content item is a highest predicted probability of a plurality of predicted probabilities associated with the plurality of participating content items. Alternatively and/or additionally, the second content item may be selected for presentation via the second client device based upon the bid value associated with the second content item and/or the predicted probability of the second user positively engaging with the second content item.

The second content item may be transmitted to the second client device (and/or may be provided to the second client device for presentation via the second internet resource). In some examples, the second content item may be one or more of an advertisement, an image, a link, a video, etc. Alternatively and/or additionally, the second content item may be displayed on one or more locations of the second internet resource (e.g., if the second internet resource is a web page, the second content item may be displayed and/or presented on one or more locations of the web page and/or if the second internet resource is an application, the second content item may be displayed and/or presented on one or more locations of the application, for example).

In some examples, responsive to a determination that the second request for content is fraudulent and/or responsive to a determination that the second probability that the second request for content is fraudulent is higher than the threshold fraudulence probability, the second request for content may be discarded. Alternatively and/or additionally, responsive to a determination that the second request for content is fraudulent and/or responsive to a determination that the second probability that the second request for content is fraudulent is higher than the threshold fraudulence probability, a content item (e.g., the second content item) associated with the second request for content may not be transmitted to the second client device. Alternatively and/or additionally, responsive to a determination that the second request for content is fraudulent and/or responsive to a determination that the second probability that the second request for content is fraudulent is higher than the threshold fraudulence probability, the bidding process may not be performed for selecting a content item for transmission to the second client device. Alternatively and/or additionally, responsive to a determination that the second request for content is fraudulent and/or responsive to a determination that the second probability that the second request for content is fraudulent is higher than the threshold fraudulence probability, the third client device identifier and/or a user identifier (e.g., a username) associated with the second client device may be blacklisted.

In some examples, the second fraudulence label may be determined based upon a second set of client information associated with the second client device. In some examples, the second set of client information may be received from the second client device responsive to transmitting the second content item to the second client device. Alternatively and/or additionally, the second set of client information may be received responsive to the second client device receiving the second content item. Alternatively and/or additionally, the second set of client information may be received responsive to the second content item being presented via the second client device. Alternatively and/or additionally, the second set of client information may be received responsive to a selection of the second content item via the second client device. For example, one or more second executable instructions may be transmitted to the second client device in association with the second content item being transmitted to the second client device. Execution of the one or more second executable instructions may cause the second client device to transmit the second set of client information to the content system.

In some examples, the second fraudulence label may be determined based upon the second set of client information and/or the one or more client information characteristics associated with fraudulent requests for content. For example, the second set of client information may be compared with the one or more client information characteristics associated with fraudulent requests for content to determine a second similarity between the second set of client information and/or the one or more client information characteristics associated with fraudulent requests for content. The second fraudulence label may be determined based upon the similarity and/or the second similarity. For example, a higher similarity between the second set of client information and the one or more client information characteristics associated with fraudulent requests for content may correspond to a higher probability that the second request for content is fraudulent. Alternatively and/or additionally, the second fraudulence label may be indicative of the second request for content being fraudulent if the second similarity meets a second similarity threshold.

In some examples, the second fraudulence label and/or the second similarity may be determined based upon a determination that one or more characteristics of the second set of client information matches one or more characteristics of the one or more client information characteristics associated with fraudulent requests for content. The second fraudulence label may be indicative of the second request for content being fraudulent based upon the determination that one or more characteristics of the second set of client information matches one or more characteristics of the one or more client information characteristics. Alternatively and/or additionally, the second probability that the second request is fraudulent may be determined based upon the determination that one or more characteristics of the second set of client information matches one or more characteristics of the one or more client information characteristics.

In an example, the second fraudulence label and/or the second similarity may be determined based upon one or more software capabilities associated with the second client device matching the one or more first software capability characteristics associated with fraudulent requests for content. For example, the second set of client information may be indicative of the one or more software capabilities corresponding to one or more plugins installed on a browser of the second client device and/or one or more functionalities of the browser of the second client device. For example, a plugin of the one or more plugins may match a plugin of the one or more first plugins associated with fraudulent requests for content. Alternatively and/or additionally, a functionality of the one or more functionalities may match a software capability of the one or more first software capabilities associated with fraudulent requests for content. The second fraudulence label may be indicative of the second request for content being fraudulent based upon the determination that the one or more software capabilities associated with the second client device matches the one or more first software capability characteristics associated with fraudulent requests for content. Alternatively and/or additionally, the second probability that the second request is fraudulent may be determined based upon the determination that the one or more software capabilities associated with the second client device matches the one or more first software capability characteristics associated with fraudulent requests for content.

In some examples, the second fraudulence label may be determined using the machine learning model. For example, the second request for content, the second set of request information and/or the second set of client information may be input to the machine learning model. The machine learning model may determine the second fraudulence label based upon the second request for content, the second set of request information, the second set of client information, the fraud detection database (e.g., the plurality of sets of fraud detection information), the one or more request information characteristics and/or the one or more client information characteristics associated with fraudulent requests for content.

In some examples, a determination that the second request for content is fraudulent may be indicative of the second client device being controlled via one or more of automated operation functionalities, malware, hacking techniques, etc. associated with a malicious entity, to transmit the second request for content (to the content system). Alternatively and/or additionally, the second probability that the second request for content is fraudulent may be indicative of a probability that the second client device is controlled via one or more of automated operation functionalities, malware, hacking techniques, etc. associated with a malicious entity, to transmit the second request for content (to the content system).

FIGS. 5A-5K illustrate examples of a system 501 for determining whether requests for content are fraudulent. A first user, such as user Jennifer, (and/or a first client device 500 associated with the first user) may access and/or interact with a service, such as a browser, software, a website, an application, an operating system, an email interface, a messaging interface, a music-streaming application, a video application, etc. that provides a platform for viewing and/or downloading content from a server associated with a content system.

Figure 5A:
FIG. 5A is a component block diagram illustrating an example system for determining whether requests for content are fraudulent, where a first client device presents and/or accesses a first web page using a browser of the first client device.

FIG. 5A illustrates the first client device 500 presenting and/or accessing a first web page 508 using a browser of the first client device 500. The browser may comprise an address bar 502 comprising a web address (e.g., a URL) of the first web page 508. The first web page 508 may comprise a search interface. For example, the search interface may comprise a web search engine designed to search for information throughout the internet. In some examples, the first web page 508 may comprise a search field 506. For example, a query "stock market" may be entered into the search field 506. In some examples, the first web page 508 may comprise a search selectable input 504 corresponding to performing a search based upon the query. For example, the search selectable input 504 may be selected.

Figure 5B:
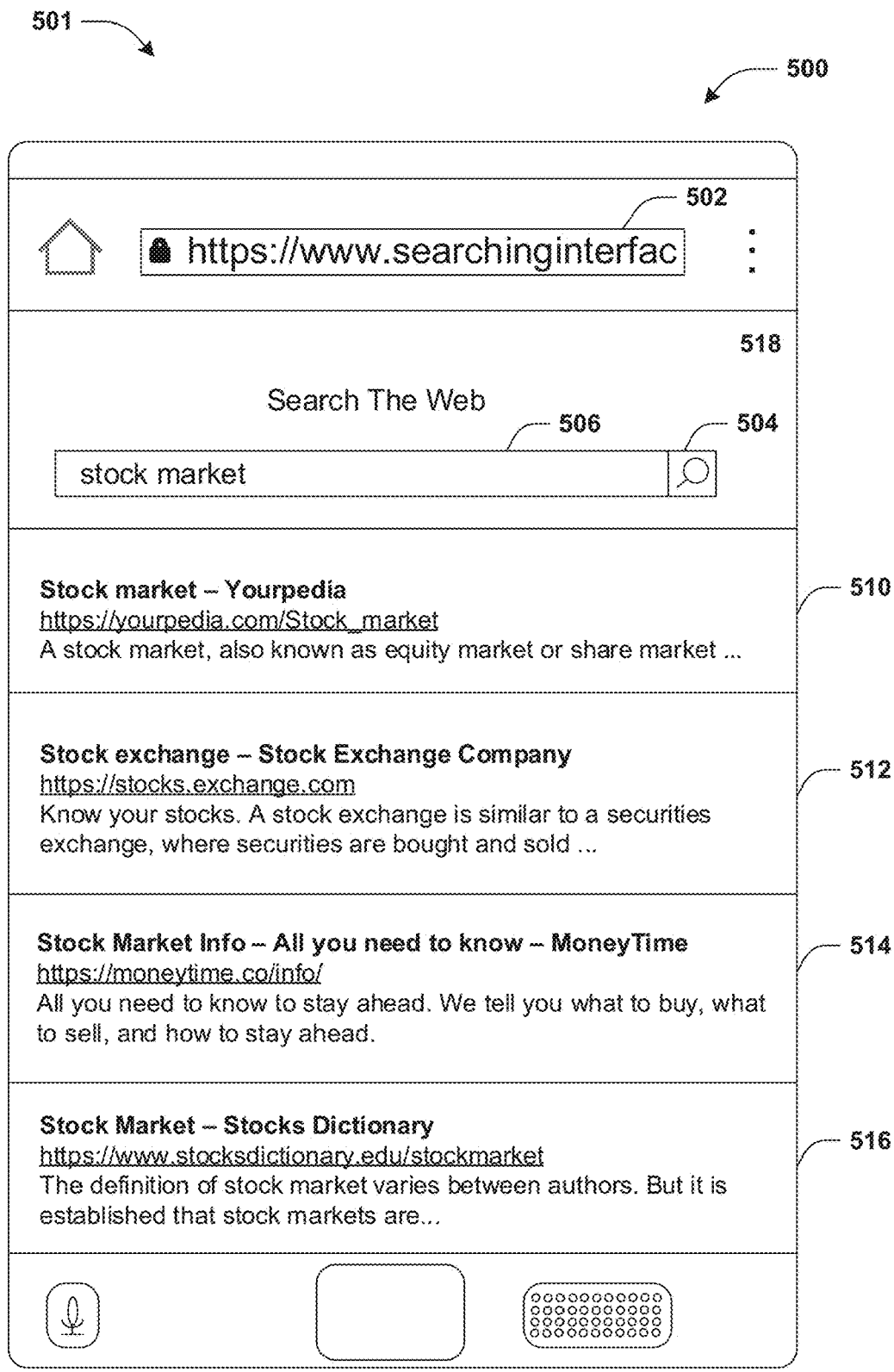
FIG. 5B is a component block diagram illustrating an example system for determining whether requests for content are fraudulent, where a first client device presents a plurality of search results associated with a query using a browser of the first client device.

FIG. 5B illustrates the first client device 500 presenting a plurality of search results associated with the query using the browser of the first client device 500. For example, the plurality of search results may be presented within a second web page 518. For example, the plurality of search results may comprise a first search result 510 corresponding to a third web page, a second search result 512 corresponding to a fourth web page 520 (illustrated in FIG. 5E), a third search result 514 corresponding to a fifth web page and/or a fourth search result 516 corresponding to a sixth web page.

In some examples, each search result of the plurality of search results may comprise a selectable input (e.g., a link) corresponding to accessing a web page associated with the search result. In some examples, the second search result 512 corresponding to the fourth web page 520 may be selected (e.g., the second search result 512 may be selected via a second selectable input corresponding to the second search result 512).

Figure 5C:
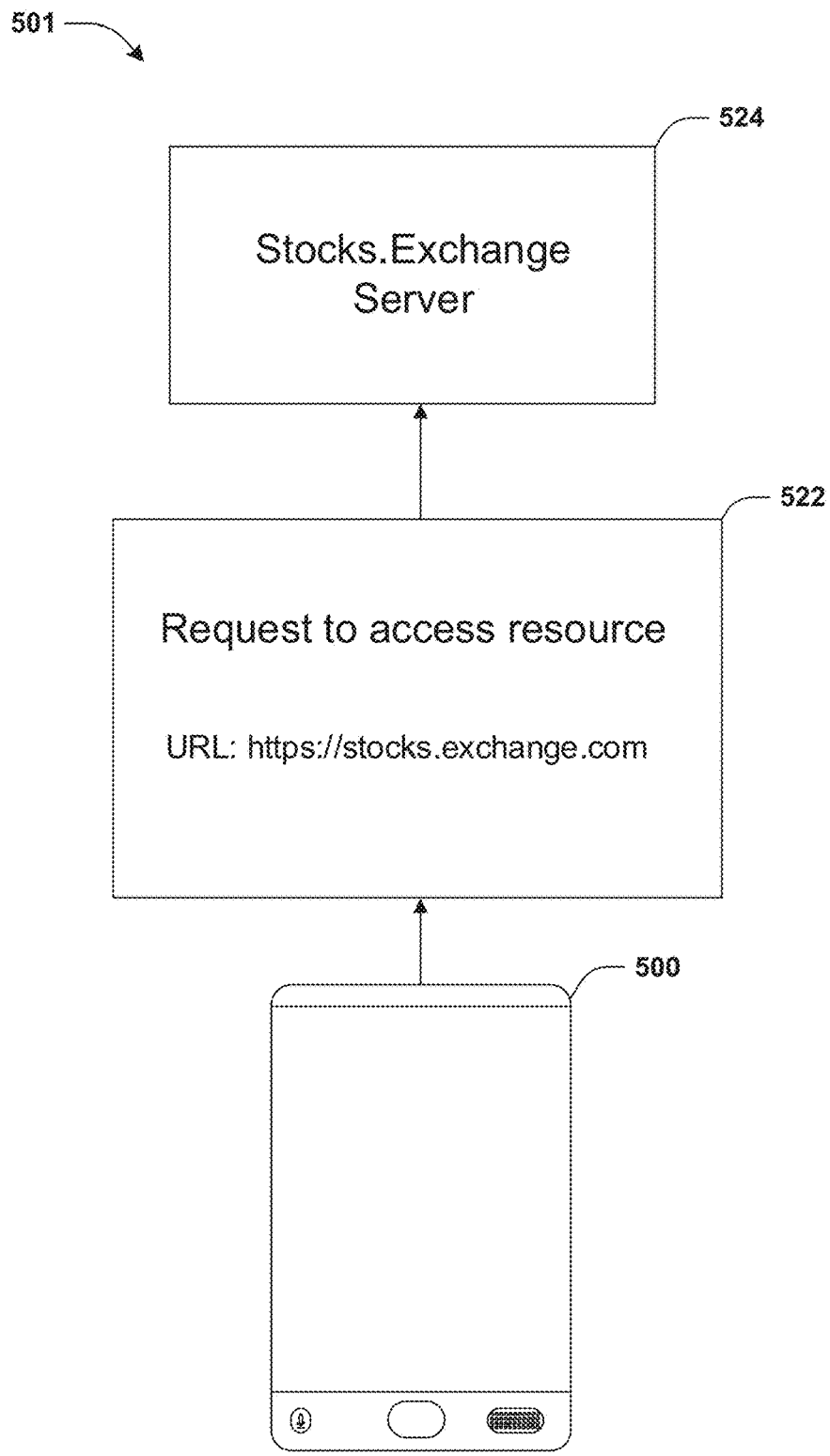
FIG. 5C is a component block diagram illustrating an example system for determining whether requests for content are fraudulent, where a first client device transmits a request to access a resource to a first server.

FIG. 5C illustrates the first client device 500 transmitting a request to access a resource 522 to a first server 524. In some examples, the request to access the resource 522 may be transmitted responsive to the second search result 512 being selected. For example, the resource may correspond to the fourth web page 520. For example, the request to access the resource 522 may comprise an indication of the fourth web page 520 (e.g., a web address "https://stocks.exchange.com"). Alternatively and/or additionally, the first server 524 may be associated with the fourth web page 520. In some examples, the request to access the resource 522 may comprise a first set of request information 540 (illustrated in FIG. 5G). The first set of request information 540 may comprise a first set of device identification information associated with the first client device 500, a first software identifier indicative of the browser of the first client device 500 and/or a version of the browser, a first location identifier indicative of a location associated with the first client device 500 and/or a first local time identifier indicative of a local time of day associated with the first client device 500. Alternatively and/or additionally, the first set of request information 540 may not be comprised within the request to access the resource 522.

Figure 5D:
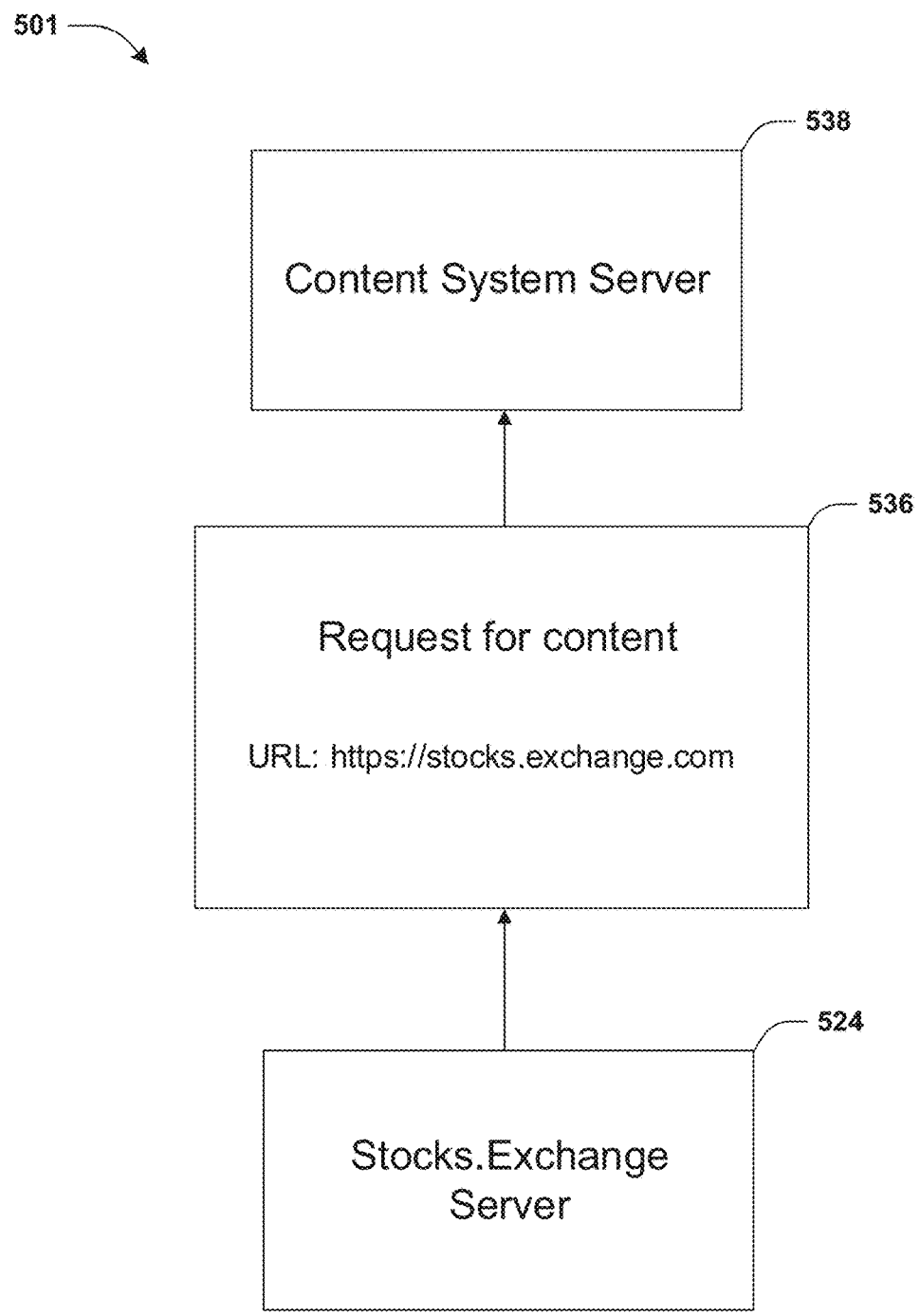
FIG. 5D is a component block diagram illustrating an example system for determining whether requests for content are fraudulent, where a first server transmits a request for content to a second server associated with a content system.

FIG. 5D illustrates the first server 524 transmitting a request for content 536 to a second server 538 associated with the content system. In some examples, the request for content 536 may be transmitted (by the first server 524) responsive to receiving the request to access the resource 522. Alternatively and/or additionally, the request for content 536 may be transmitted (to the second server 538) by the first client device 500. In some examples, the request for content 536 may be a request to be provided with a content item (e.g., an advertisement, an image, a link, a video, etc.) (for presentation via the fourth web page 520). In some examples, the request for content 536 may comprise the first set of request information 540. Alternatively and/or additionally, the first set of request information 540 may be received by the content system separately from receiving the request for content 536 (e.g., the first set of request information 540 may be transmitted by the first client device 500 and/or from the first server 524).

In some examples, responsive to receiving the request for content 536, a bidding process may be performed to select a first content item 528 (illustrated in FIG. 5E), from a plurality of participating content items participating in an auction, for presentation via the first client device 500. In some examples, the first set of request information 540 may be received prior to the bidding process is performed. The first content item 528 may be transmitted to the first client device 500. In some examples, the first content item 528 may be one or more of an advertisement, an image, a link, a video, etc.

Figure 5E:
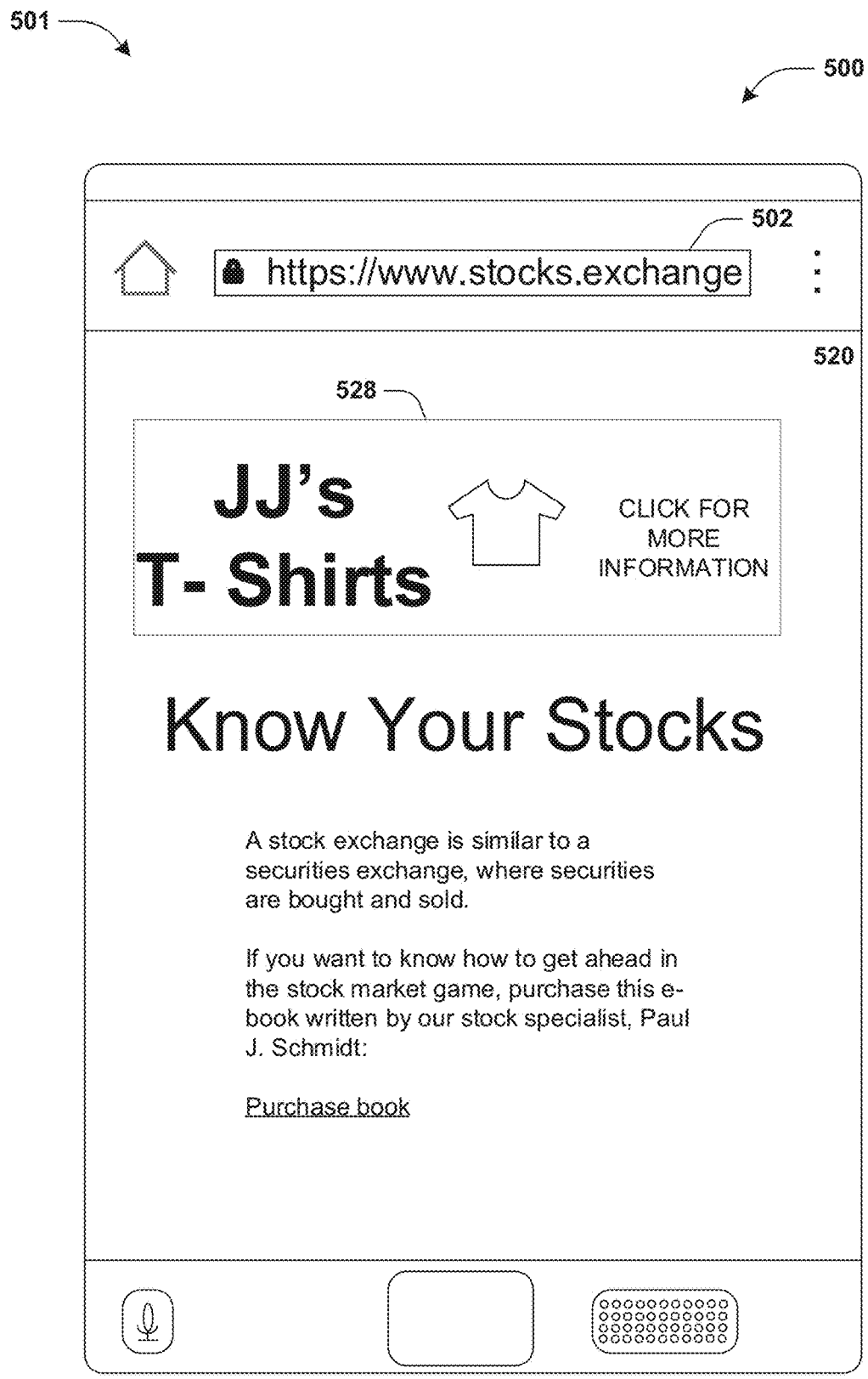
FIG. 5E is a component block diagram illustrating an example system for determining whether requests for content are fraudulent, where a first client device presents and/or accesses a fourth web page using a browser of the first client device.

FIG. 5E illustrates the first client device 500 presenting and/or accessing the fourth web page 520 using the browser of the first client device 500. For example, the content system may provide the first content item 528 to be presented via the fourth web page 520 while the fourth web page 520 is accessed by the first client device 500. Alternatively and/or additionally, one or more executable instructions may be transmitted to the first client device 500 in association with the first content item 528 being transmitted to the first client device 500. For example, the first content item 528 and/or the one or more executable instructions may be transmitted to the first client device 500 via a single set of data. Alternatively and/or additionally, the first content item 528 and/or the one or more executable instructions may be transmitted to the first client device 500 separately.

In some examples, the one or more executable instructions may be comprised within code (e.g., Javascript code and/or code associated with a different programming language) that may be executed by the first client device 500 (e.g., the code may be executed by the browser). For example, the one or more executable instructions may be executed by the first client device 500 responsive to receiving the first content item 528 and/or responsive to presenting the first content item 528. Alternatively and/or additionally, the one or more executable instructions may be executed by the first client device 500 responsive to a selection of the first content item 528 via the first client device 500. In some examples, the one or more executable instructions may comprise instructions to transmit a first set of client information 530 (illustrated in FIG. 5F) to the content system. For example, execution of the one or more executable instructions may cause the first client device 500 to transmit the first set of client information 530 to the content system.

Figure 5F:
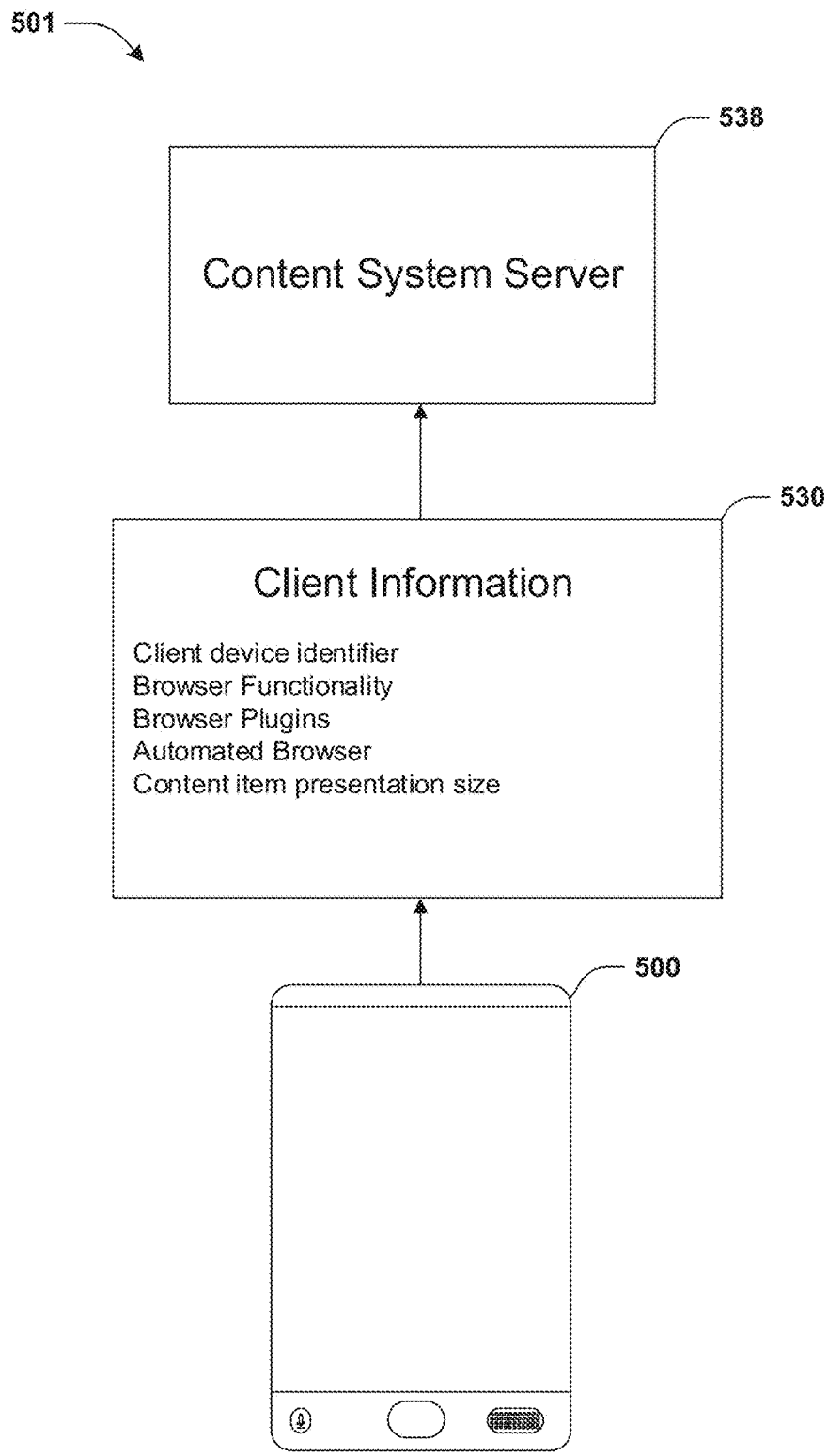
FIG. 5F is a component block diagram illustrating an example system for determining whether requests for content are fraudulent, where a first client device transmits a first set of client information to a second server associated with a content system.

FIG. 5F illustrates the first client device 500 transmitting the first set of client information 530 to the second server 538 associated with the content system. For example, the first set of client information 530 may be received by the content system responsive to transmitting the first content item 528 to the first client device 500 and/or responsive to execution of the one or more executable instructions. In some examples, the first set of client information 530 may comprise one or more of a second set of device identification information associated with the first client device 500, a second device capability identifier associated with the first client device 500, a user identifier associated with the first client device 500, a second device type identifier associated with the first client device 500, a second software identifier indicative of the browser of the first client device 500 and/or the version of the browser, a second location identifier indicative of a location associated with the first client device 500, a content item presentation associated with presentation of the first content item 528 using the first client device 500, one or more plugins associated with the browser, one or more functionalities of the browser, one or more automated operation functionalities associated with the first client device 500, etc.

Figure 5G:
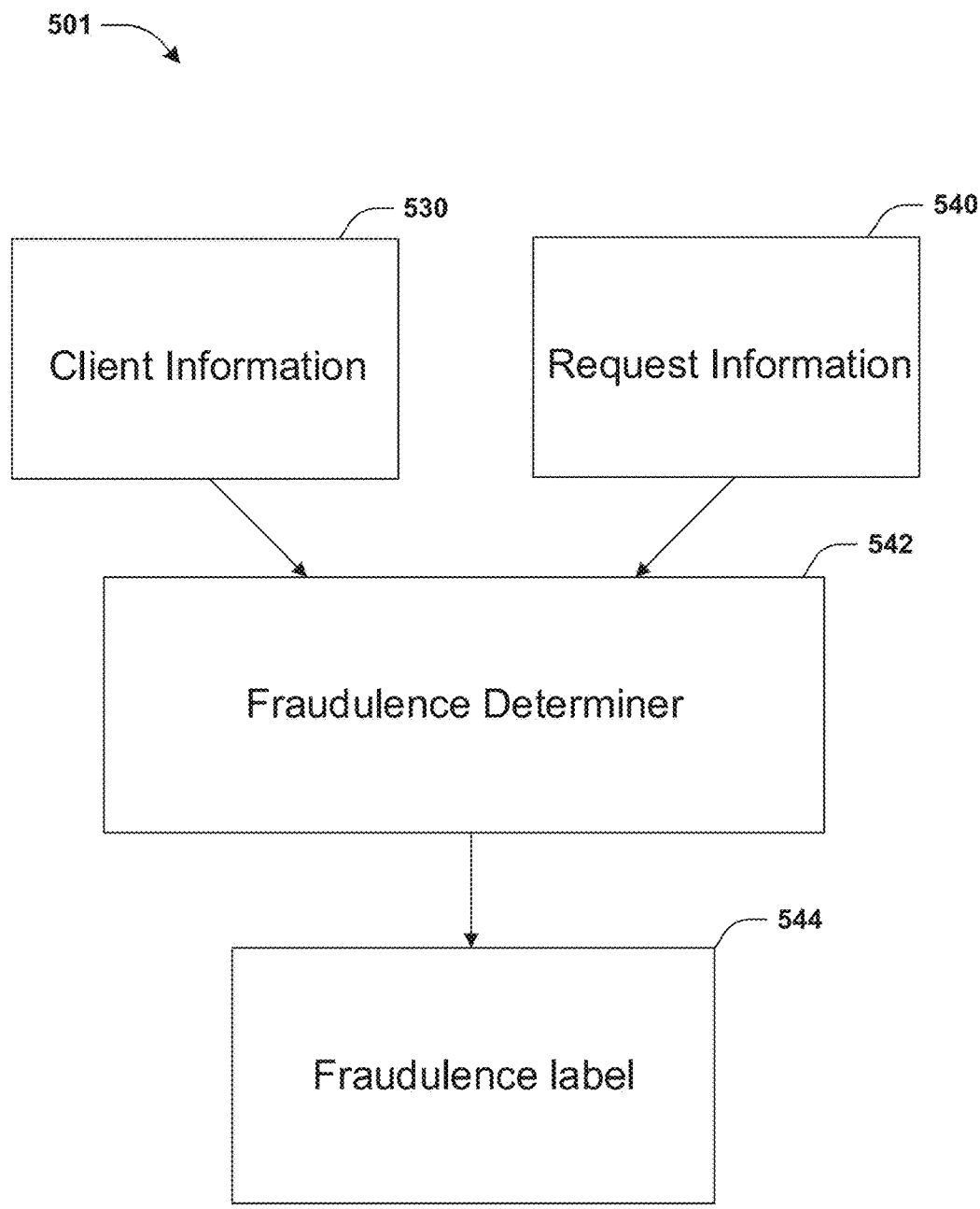
FIG. 5G is a component block diagram illustrating an example system for determining whether requests for content are fraudulent, where a first fraudulence label is determined based upon a first set of client information and/or a first set of request information.

FIG. 5G illustrates a first fraudulence label 544 being determined based upon the first set of client information 530 and/or the first set of request information 540. For example, the first fraudulence label 544 may be determined using a fraudulence determiner 542. The fraudulence determiner 542 may determine the first fraudulence label 544 by comparing the first set of client information 530 with the first set of request information 540 to determine one or more inconsistencies between the first set of client information 530 and the first set of request information 540. In some examples, the fraudulence label 544 may be indicative of the request for content 528 being fraudulent based upon the one or more inconsistencies.

In some examples, a first set of fraud detection information associated with the request for content 536 may be generated based upon the first set of request information 540, the first set of client information 530 and/or the first fraudulence label 544. The first set of fraud detection information may be stored in a fraud detection database. The fraud detection database may comprise a plurality of sets of fraud detection information associated with a plurality of requests for content associated with a plurality of client devices. In some examples, first request information (of the fraud detection database) associated with fraudulent requests for content may be analyzed to determine one or more request information characteristics associated with fraudulent requests for content.

Figure 5H:
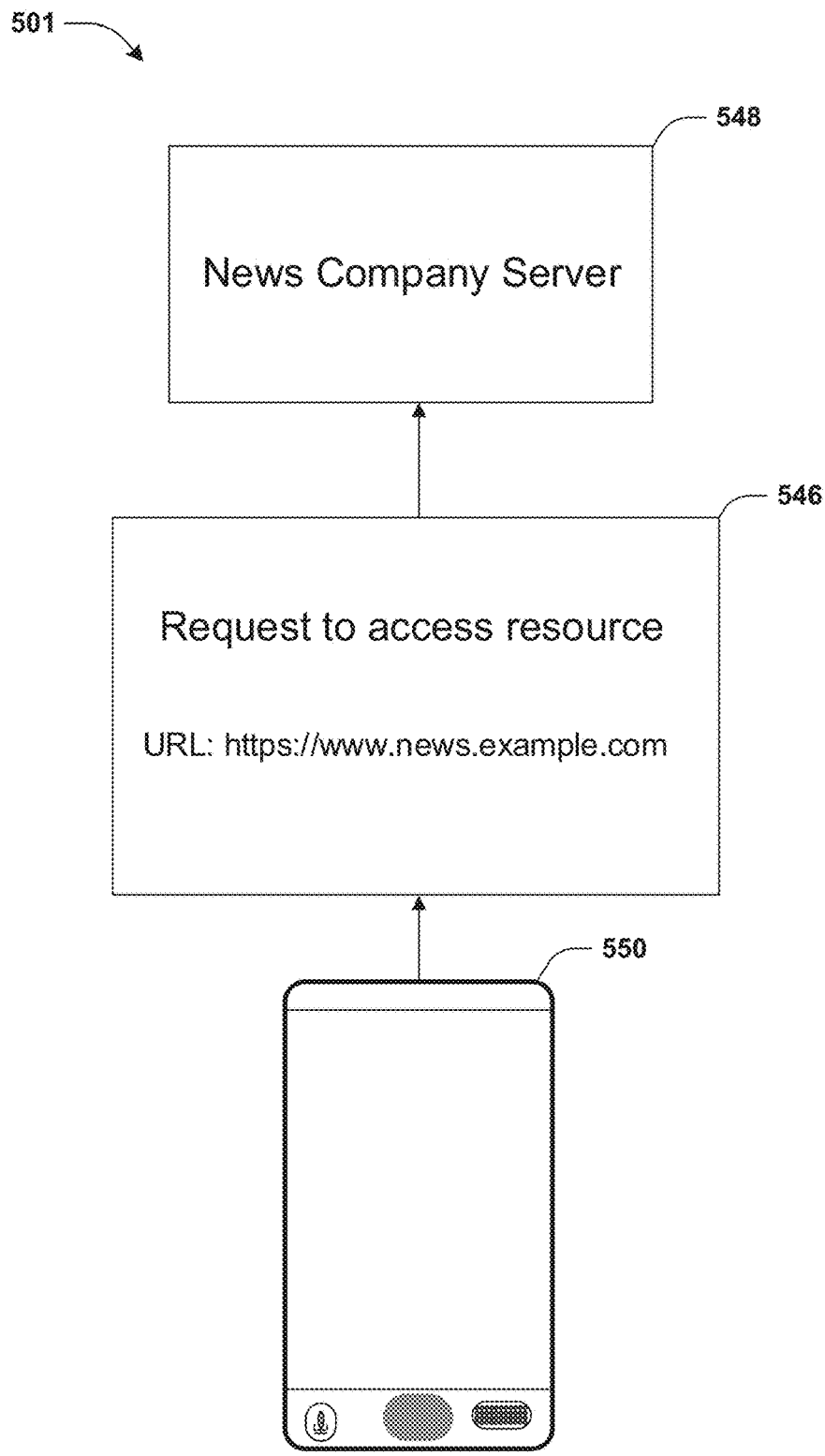
FIG. 5H is a component block diagram illustrating an example system for determining whether requests for content are fraudulent, where a second client device transmits a request to access a resource to a third server.

FIG. 5H illustrates a second client device 550 transmitting a second request to access a resource 546 to a third server 528. For example, the resource may correspond to a seventh web page 556 (illustrated in FIG. 5K). For example, the second request to access the resource 546 may comprise an indication of the seventh web page 556 (e.g., a web address "https://stocks.exchange.com"). Alternatively and/or additionally, the third server 528 may be associated with the seventh web page 556. In some examples, the second request to access the resource 546 may comprise a second set of request information. The second set of request information may comprise a third set of device identification information associated with the second client device 550, a third software identifier indicative of a browser and/or an application of the second client device 550 and/or a version of the browser and/or the application, a third location identifier indicative of a location associated with the second client device 550 and/or a local time identifier indicative of a local time of day associated with the second client device 550. Alternatively and/or additionally, the second set of request information may not be comprised within the request to access the resource 522.

Figure 5I:
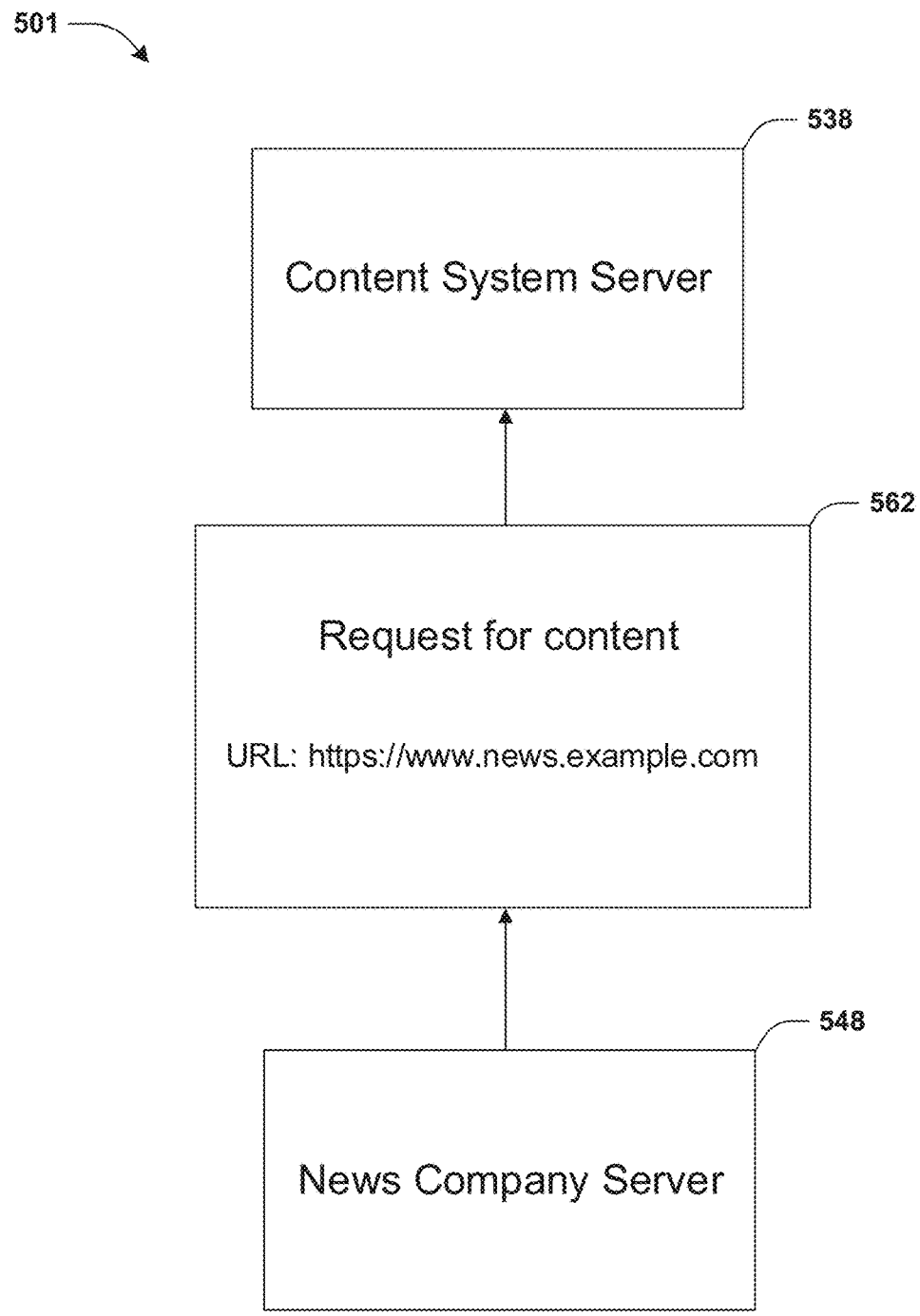
FIG. 5I is a component block diagram illustrating an example system for determining whether requests for content are fraudulent, where a third server transmits a second request for content to a second server associated with a content system.

FIG. 5I illustrates the third server 528 transmitting a second request for content 562 to the second server 538 associated with the content system. In some examples, the second request for content 562 may be transmitted (by the third server 528) responsive to receiving the request to access the resource 522. Alternatively and/or additionally, the second request for content 562 may be transmitted (to the second server 538) by the second client device 550. In some examples, the second request for content 562 may be a request to be provided with a content item (e.g., an advertisement, an image, a link, a video, etc.) (for presentation via the seventh web page 556). In some examples, the second request for content 562 may comprise the second set of request information. Alternatively and/or additionally, the second set of request information may be received by the content system separately from receiving the second request for content 562 (e.g., the second set of request information may be received from the second client device 550 and/or from the third server 528).

Figure 5J:
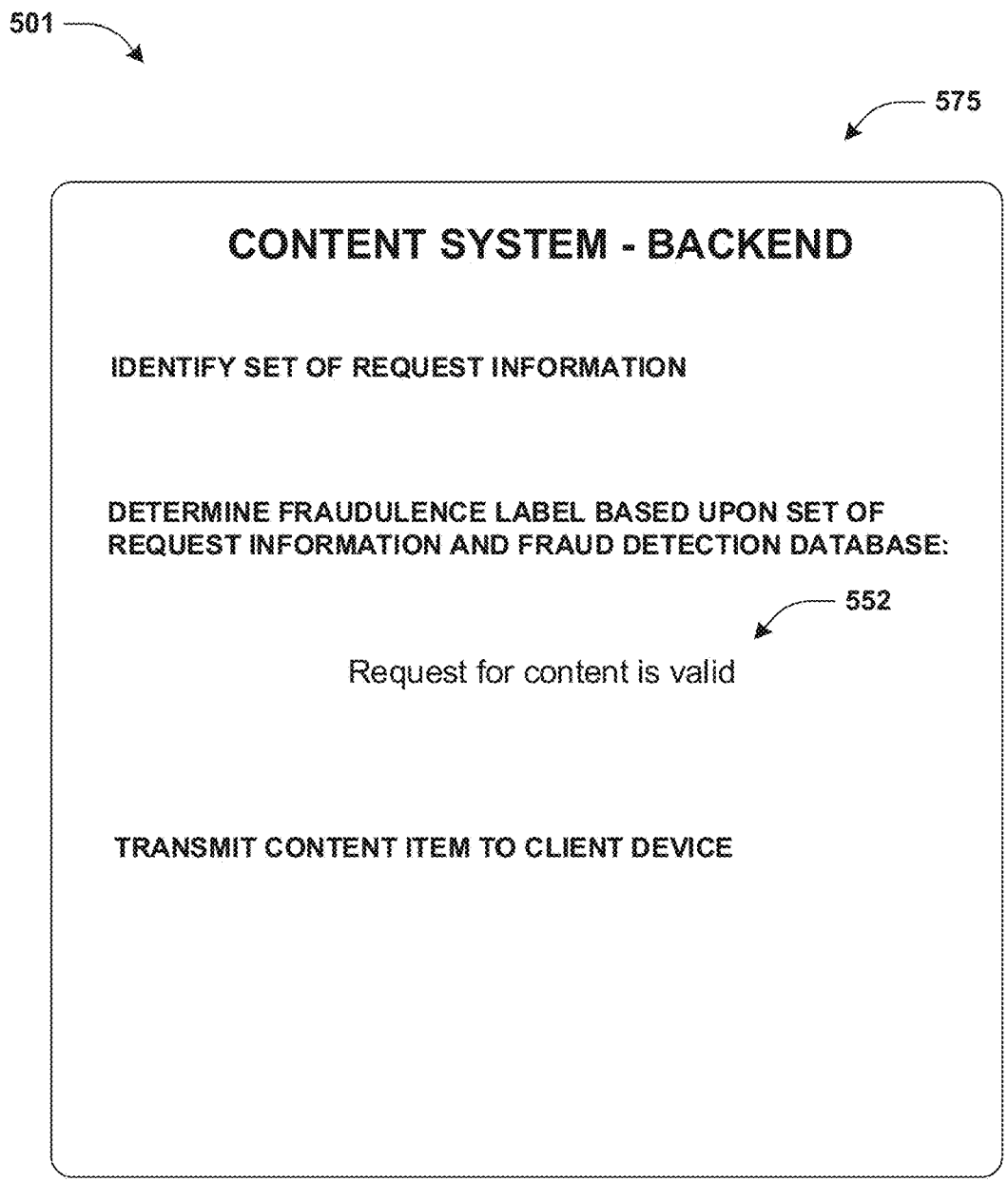
FIG. 5J is a component block diagram illustrating an example system for determining whether requests for content are fraudulent, where a backend system determines a second fraudulence label associated with a second request for content.

FIG. 5J illustrates a backend system 575 (of the content system) determining a second fraudulence label 552 associated with the second request for content 536. The backend system 575 may identify the second set of request information associated with the second request for content 562. In some examples, the second fraudulence label 552 may be determined based upon the second set of request information and/or the fraud detection database. For example, the second fraudulence label 552 may be determined based upon the second set of request information and/or the one or more request information characteristics associated with fraudulent requests for content. For example, the second set of request information may be compared with the one or more request information characteristics associated with fraudulent requests for content to determine a similarity between the second set of request information and/or the one or more request information characteristics associated with fraudulent requests for content. The second fraudulence label 552 may be determined based upon the similarity. For example, responsive to the similarity being lower than a similarity threshold, it may be determined that the second request for content 562 is valid (and/or not fraudulent). For example, the second fraudulence label 552 may be indicative of the second request for content 562 being valid.

Figure 5K:
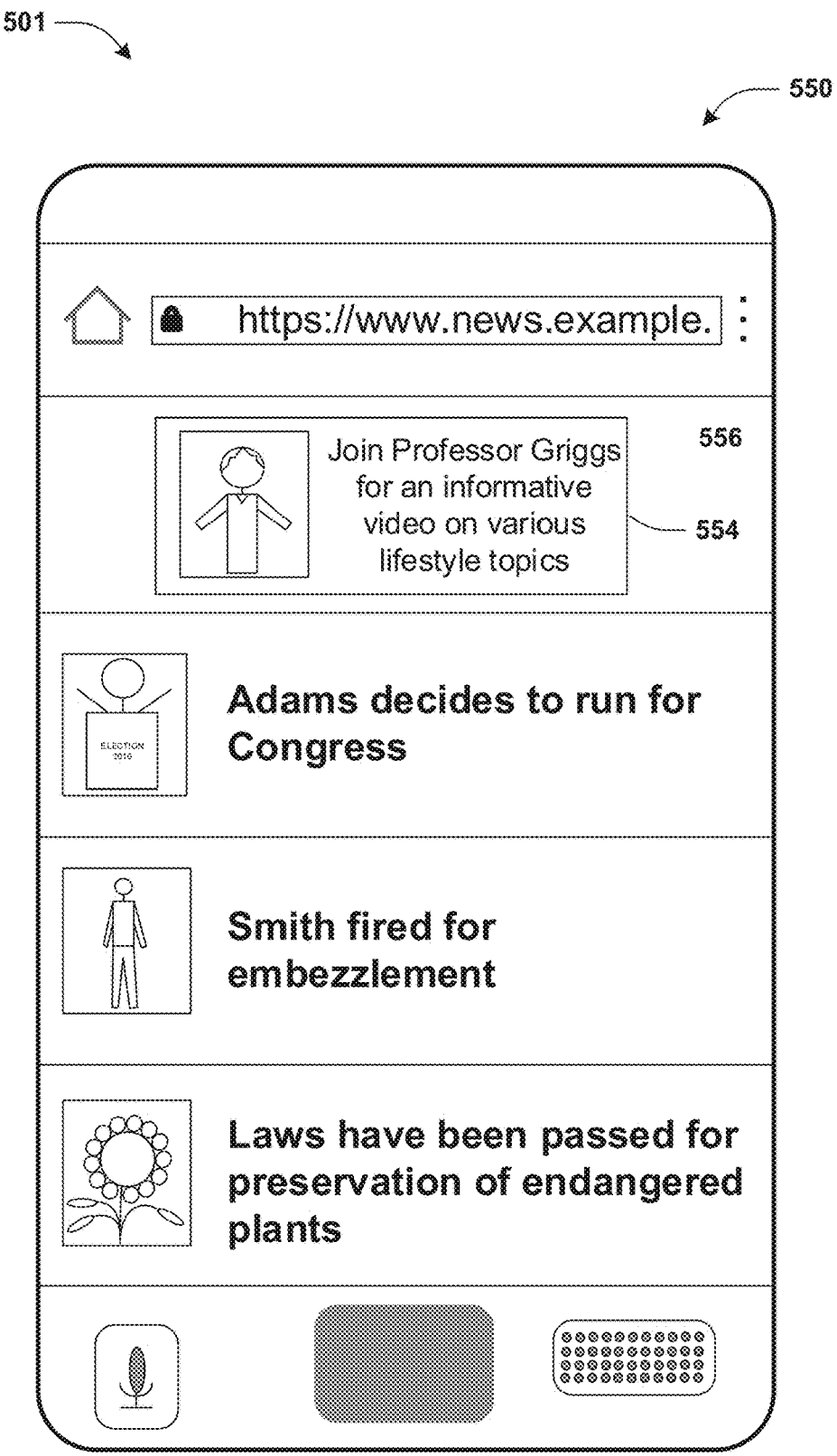
FIG. 5K is a component block diagram illustrating an example system for determining whether requests for content are fraudulent, where a second client device presents and/or accesses a seventh web page using a browser of the second client device.

In some examples, responsive to determining that the second request for content 562 is valid, a second content item 554 (illustrated in FIG. 5K) may be selected for transmission to the second client device 550. For example, the second content item 554 may be transmitted to the second client device 550. FIG. 5K illustrates the second client device 550 presenting and/or accessing the seventh web page 556 using the browser of the second client device 550. For example, the content system may provide the second content item 554 to be presented via the seventh web page 556 while the seventh web page 556 is accessed by the second client device 550.

It may be appreciated that the disclosed subject matter may prevent fraudulent activity, including, but not limited to, advertisement fraud. For example, a request for content may be received from a device. A set of request information associated with the request for content may be received prior to performing a bidding process and/or prior to selecting a content item for transmission to the device. By analyzing the set of request information received prior to performing the bidding process as well as a set of client information received after the bidding process, fraudulent advertisement requests may be more prevalently and/or more accurately identified. Further, by identifying patterns and/or characteristics of request information associated with fraudulent advertisement requests, request information associated with advertisement requests may be analyzed based upon the patterns and/or the characteristics to identify fraudulent advertisement requests.

Further, malicious entities may be discouraged from performing malicious actions (e.g., using one or more automated operation functionalities, hacking techniques, malware, etc.) to control client devices for transmission of advertisement requests because, by implementing one or more of the techniques presented herein, it is more difficult for a malicious entity to successfully control a client device for transmission of a fraudulent advertisement request that is not identified as fraudulent by the content system.

Further, some fraud detecting systems may attempt to identify fraudulent advertisement requests based upon IP addresses associated with the fraudulent advertisement requests (e.g., determining whether the IP addresses are suspicious, determining whether the IP addresses are not residential IP addresses, determining whether the IP addresses are blacklisted, etc.). However, because these fraud detecting systems may merely analyze IP addresses associated with advertisement requests (and/or may not analyze user profiles, for example), these fraud detecting systems may not identify fraudulent advertisement requests from client devices (that are not suspicious, for example), where the client devices may be hacked and/or controlled (by malicious entities, for example), resulting in transmission of the fraudulent advertisement requests.

Implementation of at least some of the disclosed subject matter may lead to benefits including, but not limited to, a reduction in transmission of fraudulent advertisement requests (and/or a reduction in bandwidth) (e.g., as a result of discouraging malicious entities from performing malicious actions to control client devices for transmission of advertisement requests).

Alternatively and/or additionally, implementation of at least some of the disclosed subject matter may lead to benefits including a reduction in instances that client devices are hacked and/or controlled for transmission of fraudulent advertisement requests (e.g., as a result of discouraging malicious entities from performing malicious actions to control client devices for transmission of fraudulent advertisement requests).

Alternatively and/or additionally, implementation of at least some of the disclosed subject matter may lead to benefits including preventing unauthorized access of client devices and/or the content system from unauthorized access (e.g., as a result of discouraging malicious entities from performing malicious actions to control client devices for transmission of fraudulent advertisement requests). Alternatively and/or additionally, implementation of at least some of the disclosed subject matter may lead to benefits including decreasing security resources needed to protect client devices and/or the content system from unauthorized access.

Alternatively and/or additionally, implementation of at least some of the disclosed subject matter may lead to benefits including reducing bandwidth (e.g., as a result of identifying fraudulent advertisement requests and/or not transmitting content items associated with the fraudulent advertisement requests to client devices).

Alternatively and/or additionally, implementation of at least some of the disclosed subject matter may lead to benefits including reducing an amount spent by entities (e.g., advertisers) on fraudulent advertisement requests.

In some examples, at least some of the disclosed subject matter may be implemented on a client device, and in some examples, at least some of the disclosed subject matter may be implemented on a server (e.g., hosting a service accessible via a network, such as the Internet).

Figure 6:
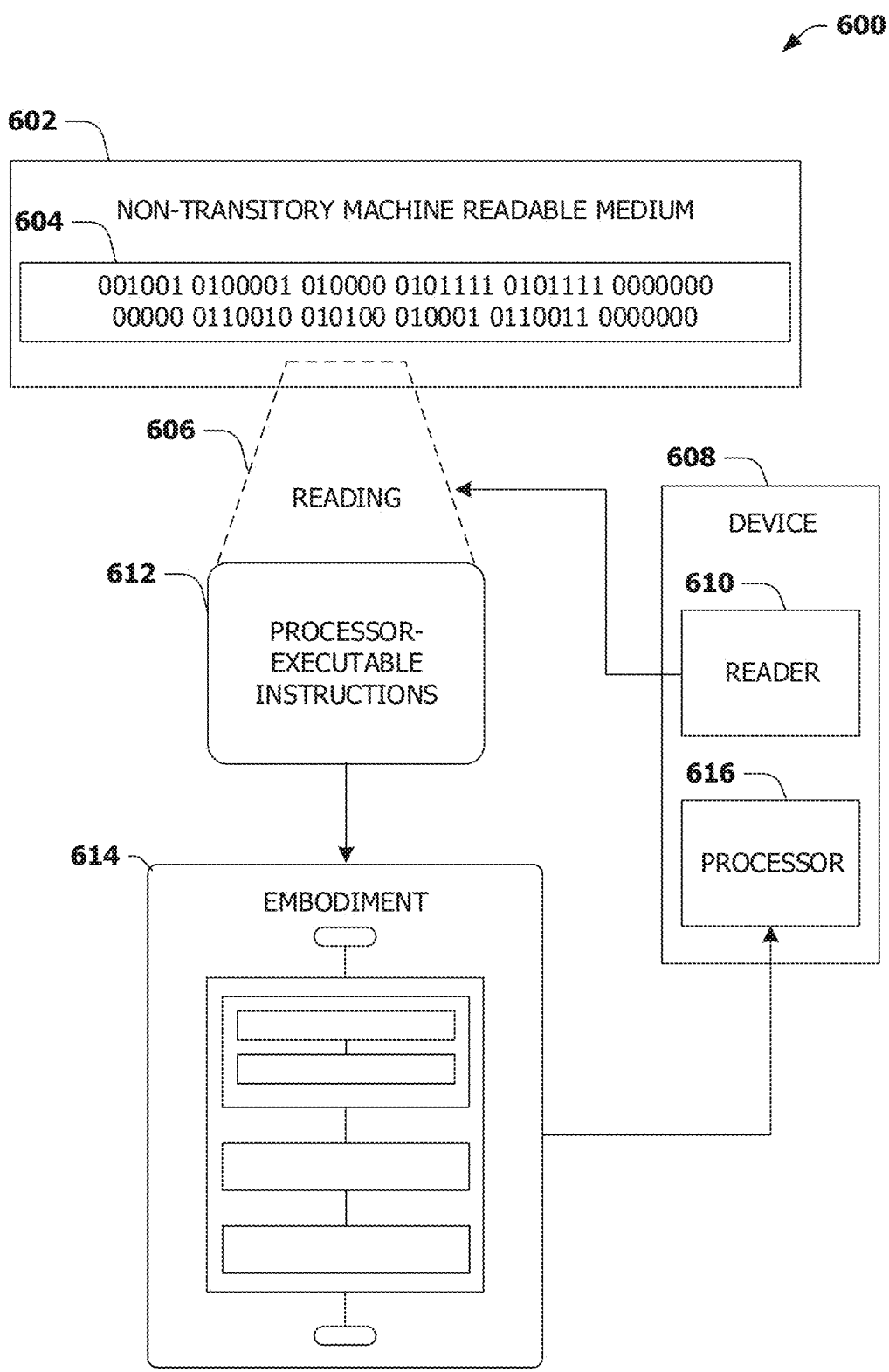
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5K, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving a first request for content, associated with a first client device, and a first set of request information associated with the first request for content;
   transmitting a first content item to the first client device responsive to receiving the first request for content;
   responsive to transmitting the first content item to the first client device in response to receiving the first request, receiving, from the first client device, a first set of client information associated with the first client device;
   comparing (i) the first set of client information received from the first client device in association with the first request with (ii) the first set of request information received from the first client device in association with the first request to identify one or more inconsistencies between the first set of client information from the first client device and the first set of request information from the first client device;

determining, based upon the one or more inconsistencies, a first fraudulence label associated with the first request for content;

generating, based upon the first set of request information, the first set of client information and the first fraudulence label, a first set of fraud detection information associated with the first request for content;

storing the first set of fraud detection information in a fraud detection database comprising a plurality of sets of fraud detection information associated with a plurality of requests for content associated with a plurality of client devices;

receiving a second request for content, associated with a second client device, and a second set of request information associated with the second request for content; and determining, based upon the second set of request information and one or more request information characteristics determined using the fraud detection database, a second fraudulence label associated with the second request for content.

2. The method of claim 1, comprising:
transmitting one or more executable instructions to the first client device in association with the transmitting the first content item to the first client device, wherein execution of the one or more executable instructions by the first client device causes transmission of the first set of client information by the first client device.

3. The method of claim 1, wherein:
the first fraudulence label is indicative of at least one of:
the first request for content being fraudulent;
the first request for content being valid; or
a probability that the first request for content is fraudulent; and
the second fraudulence label is indicative of at least one of:
the second request for content being fraudulent;
the second request for content being valid; or
a probability that the second request for content is fraudulent.

4. The method of claim 1, wherein the first set of request information is comprised within the first request for content.

5. The method of claim 1, wherein the first set of request information is received separately from the first request for content.

6. The method of claim 1, wherein the comparing comprises:
determining, based upon the first set of client information, a content item presentation size associated with presentation of the first content item using the first client device, wherein the first fraudulence label is determined based upon the content item presentation size.

7. The method of claim 1, wherein the comparing comprises:
determining, based upon the first set of client information, a content item presentation size associated with presentation of the first content item using the first client device; and
comparing the content item presentation size with a threshold content item presentation size, wherein:
the first request for content is determined to be fraudulent based upon a determination that the content item presentation size does not meet the threshold content item presentation size; and
the first fraudulence label is indicative of the first request for content being fraudulent.

8. The method of claim 1, wherein the comparing comprises:
determining, based upon the first set of client information, one or more automated operation functionalities of the first client device, wherein the first fraudulence label is determined based upon the one or more automated operation functionalities.

9. The method of claim 1, wherein the comparing comprises:
determining, based upon the first set of client information, one or more automated operation functionalities of the first client device, wherein:
the first request for content is determined to be fraudulent based upon the one or more automated operation functionalities; and
the first fraudulence label is indicative of the first request for content being fraudulent.

10. The method of claim 1, wherein the comparing comprises:
analyzing the first set of client information to identify an indication of a first type of software used to access an internet resource associated with the first request for content;
analyzing the first set of client information to identify an indication of a second type of software used to access the internet resource; and
determining that the first type of software is different than the second type of software, wherein the first fraudulence label is determined based upon the first type of software being different than the second type of software.

11. The method of claim 1, wherein the comparing comprises:
analyzing the first set of client information to identify an indication of a first type of software used to access an internet resource associated with the first request for content;
analyzing the first set of client information to identify an indication of a second type of software used to access the internet resource; and
determining that the first type of software is different than the second type of software, wherein:
the first request for content is determined to be fraudulent based upon the first type of software being different than the second type of software; and
the first fraudulence label is indicative of the first request for content being fraudulent.

12. The method of claim 1,
wherein:
the determining the second fraudulence label associated with the second request for content comprises comparing the second set of request information with the one or more request information characteristics to determine a similarity between the second set of request information and the one or more request information characteristics; and
the second fraudulence label is determined based upon the similarity.

13. The method of claim 12, comprising: analyzing the fraud detection database to identify request information associated with a second plurality of requests for content associated with one or more fraudulence labels, wherein:
the one or more fraudulence labels associated with the second plurality of requests for content are indicative of at least one of:
the second plurality of requests for content being fraudulent; or probabilities that the second plurality of requests for content are fraudulent being higher than a threshold probability; and the one or more request information characteristics are determined based upon the request information associated with the second plurality of requests for content.

14. The method of claim 1, wherein:
the first set of request information is indicative of at least one of:
  a web address associated with the first request for content;
  an application associated with the first request for content;
  a local time of day associated with the first client device and the first request for content;
  a client device identifier associated with the first client device; or
  a type of software used to access an internet resource associated with the first request for content; and
the second set of request information is indicative of at least one of:
  a web address associated with the second request for content;
  an application associated with the second request for content;
  a local time of day associated with the second client device and the second request for content;
  a client device identifier associated with the second client device; or
  a type of software used to access an internet resource associated with the second request for content.

15. The method of claim 1, wherein the first set of client information is indicative of at least one of:
  a client device identifier associated with the first client device;
  a type of software used to access an internet resource associated with the first request for content;
  a content item presentation size associated with presentation of the first content item using the first client device; or
  one or more automated operation functionalities of the first client device.

16. The method of claim 1, wherein the second fraudulence label is indicative of the second request for content being fraudulent, the method comprising:
  not transmitting a content item, associated with the second request for content, to the second client device.

17. The method of claim 1, wherein at least one of:
the first request for content is received from the first client device; or
the second request for content is received from the second client device.

18. The method of claim 1, wherein at least one of:
the first request for content is received from a first server associated with a first internet resource accessed by the first client device; or
the second request for content is received from a second server associated with a second internet resource accessed by the second client device.

19. A computing device comprising:
a processor; and
memory comprising processor-executable instructions that when executed by the processor cause performance of operations, the operations comprising:
  receiving a first request for content, associated with a first client device, and a first set of request information associated with the first request for content;
  transmitting a first content item to the first client device responsive to receiving the first request for content;
  responsive to transmitting the first content item to the first client device in response to receiving the first request, receiving, from the first client device, a first set of client information associated with the first client device;
  comparing (i) the first set of client information received from the first client device in association with the first request with (ii) the first set of request information received from the first client device in association with the first request to identify one or more inconsistencies between the first set of client information from the first client device and the first set of request information from the first client device;
  determining, based upon the one or more inconsistencies, a first fraudulence label associated with the first request for content;
  generating, based upon at least one of the first set of request information, the first set of client information or the first fraudulence label, a first set of fraud detection information associated with the first request for content;
  storing the first set of fraud detection information in a fraud detection database comprising a plurality of sets of fraud detection information associated with a plurality of requests for content associated with a plurality of client devices;
  receiving a second request for content, associated with a second client device, and a second set of request information associated with the second request for content; and
  determining, based upon the second set of request information and one or more request information characteristics determined using the fraud detection database, a second fraudulence label associated with the second request for content.

20. A non-transitory machine readable medium having stored thereon processor-executable instructions that when executed cause performance of operations, the operations comprising:
  receiving a first request for content, associated with a first client device, and a first set of request information associated with the first request for content;
  transmitting a first content item to the first client device responsive to receiving the first request for content;
  responsive to transmitting the first content item to the first client device in response to receiving the first request, receiving, from the first client device, a first set of client information associated with the first client device;
  comparing (i) the first set of client information received from the first client device in association with the first request with (ii) the first set of request information received from the first client device in association with the first request to identify one or more inconsistencies between the first set of client information from the first client device and the first set of request information from the first client device;
  determining, based upon the one or more inconsistencies, a first fraudulence label associated with the first request for content;
  generating, based upon at least one of the first set of request information, the first set of client information or the first fraudulence label, a first set of fraud detection information associated with the first request for content;

storing the first set of fraud detection information in a fraud detection database comprising a plurality of sets of fraud detection information associated with a plurality of requests for content associated with a plurality of client devices;

receiving a second request for content, associated with a second client device, and a second set of request information associated with the second request for content; and determining, based upon the second set of request information and one or more request information characteristics determined using the fraud detection database, a second fraudulence label associated with the second request for content.

\* \* \* \* \*